(12) United States Patent
Fogelström et al.

(10) Patent No.: US 12,036,694 B2
(45) Date of Patent: Jul. 16, 2024

(54) GREEN WOOD ADHESIVE

(71) Applicant: KTH HOLDING AB, Stockholm (SE)

(72) Inventors: Linda Fogelström, Ekerö (SE); Eva Malmström-Jonsson, Sollentuna (SE); Emelie Norström, Torsåker (SE); Deniz Demircan, Stockholm (SE); Farideh Khabbaz, Nacka (SE)

(73) Assignee: KTH HOLDING AB, Stockholm (SE)

( * ) Notice: Subject to any disclaimer, the term of this patent is extended or adjusted under 35 U.S.C. 154(b) by 607 days.

(21) Appl. No.: 17/056,635

(22) PCT Filed: May 21, 2019

(86) PCT No.: PCT/SE2019/050465
§ 371 (c)(1),
(2) Date: Nov. 18, 2020

(87) PCT Pub. No.: WO2019/226108
PCT Pub. Date: Nov. 28, 2019

(65) Prior Publication Data
US 2021/0362366 A1    Nov. 25, 2021

(30) Foreign Application Priority Data
May 21, 2018 (SE) ..................... 1850596-6

(51) Int. Cl.
| | |
|---|---|
| B27N 3/00 | (2006.01) |
| B27N 3/02 | (2006.01) |
| B27N 3/18 | (2006.01) |
| C08L 97/02 | (2006.01) |
| C09J 101/04 | (2006.01) |
| C09J 105/00 | (2006.01) |
| C09J 105/08 | (2006.01) |
| C09J 105/14 | (2006.01) |
| C09J 179/02 | (2006.01) |

(52) U.S. Cl.
CPC ............. *B27N 3/002* (2013.01); *B27N 3/02* (2013.01); *B27N 3/18* (2013.01); *C08L 97/02* (2013.01); *C09J 101/04* (2013.01); *C09J 105/00* (2013.01); *C09J 105/08* (2013.01); *C09J 105/14* (2013.01); *C09J 179/02* (2013.01)

(58) Field of Classification Search
None
See application file for complete search history.

(56) References Cited

U.S. PATENT DOCUMENTS

| | | | |
|---|---|---|---|
| 4,510,278 A | 4/1985 | Hoetjer | |
| 5,017,319 A | 5/1991 | Shen | |
| 2007/0004829 A1 | 1/2007 | Khabbaz | |
| 2007/0224395 A1* | 9/2007 | Rowitsch | C09J 147/00 428/323 |
| 2007/0298274 A1* | 12/2007 | Eriksson | C09J 5/00 156/60 |
| 2010/0043970 A1 | 2/2010 | Khabbaz et al. | |
| 2011/0086236 A1* | 4/2011 | Catchmark | A61L 27/02 428/478.2 |
| 2011/0229698 A1* | 9/2011 | Rasmussen | C08L 5/12 156/267 |
| 2012/0058536 A1 | 3/2012 | Ruda et al. | |
| 2012/0094047 A1 | 4/2012 | Albertson et al. | |
| 2020/0102338 A1* | 4/2020 | Persson | C13K 13/007 |

FOREIGN PATENT DOCUMENTS

| | | | |
|---|---|---|---|
| CH | 257 407 | 10/1948 | |
| CN | 101824286 A * | 9/2010 | ............ C09J 105/02 |
| CN | 104277718 A * | 1/2015 | ............ C09J 11/06 |
| CN | 104877594 | 9/2015 | |
| CN | 105583935 A * | 5/2016 | ............ B27N 1/00 |
| CN | 106118551 | 11/2016 | |
| JP | 2003-286462 | 10/2003 | |
| WO | 2007/149037 | 12/2007 | |
| WO | 2011/005181 | 1/2011 | |

OTHER PUBLICATIONS

International Search Report issued Aug. 27, 2019 in PCT Application No. PCT/SE2019/050465.
Written Opinion of the International Searching Authority issued Aug. 27, 2019 in PCT Application No. PCT/SE2019/050465.
Swedish Search Report issued Nov. 29, 2018 in corresponding Swedish Application No. 1850596-6.
Mishima et al., "Adhesion of β-D-glucans to cellulose", Carbohydrate Research, 1998, vol. 308, pp. 389-395.
Norström et al., "Xylan—A green binder for wood adhesives", European Polymer Journal, 2015, vol. 67, pp. 483-493.

* cited by examiner

*Primary Examiner* — Dale R Miller
(74) *Attorney, Agent, or Firm* — Wenderoth, Lind & Ponack, L.L.P.

(57) ABSTRACT

The present invention relates to an adhesive aqueous composition comprising a polysaccharide or a residual fraction from a pulping process comprising polysaccharide and an amine-functional polymer. The weight ratio between the polysaccharide and the amine-functional polymer is from 1:4 to 4:1; wherein the polysaccharide is hemicellulose or gum and with proviso that the composition has a pH of 6 or less when the amine-functional polymer is chitosan.

8 Claims, 13 Drawing Sheets

GREEN WOOD ADHESIVE

FIELD OF THE INVENTION

The present invention relates to a green adhesive composition based on wood products such as locust bean gum or hemicellulose separated from pulp processes, and an amine functional polymer. The present invention further relates to products containing the adhesive such as particle boards, panels, veneers and so on.

BACKGROUND

Wood adhesives are produced in large amounts every year and are used in applications such as load-bearing constructions, flooring, furniture, windows, doors, plywood, glulam beams, and particleboards. In 2015, the global wood adhesive market was estimated to be 1.96 million tons. Historically, adhesives were prepared from plants and animals. For example, starch and proteins from blood, milk, and soybean have been used as adhesives. Since the 1960s, during the early days of the plastic era, bio-based adhesives were replaced by fossil-derived adhesives with a better performance regarding bond strength and water resistance, and also a lower cost. Today, wood adhesives are mainly prepared from fossil-derived resources such as urea-formaldehyde (UF); these perform very well and are considered to be cheap. However, fossil resources are limited and non-renewable. In addition, many of the adhesives used today contain hazardous compounds, for example formaldehyde, that have a negative impact both on the environment and on human health. Therefore, it is of great importance to find alternatives to the existing adhesives that are bio-based and non-toxic.

Protein, starch, lignin, and tannin are examples of bio-based polymers that have been suggested as binders in wood adhesives but so far, none have stayed on the market for a long time. It has been difficult for bio-based adhesives to enter the market place and successfully compete with synthetic adhesives. The bio-based systems are often too expensive or do not show sufficiently good properties. The bond strength and water resistance are crucial parameters that these adhesives need to fulfill.

Proteins from blood and milk have been used for wood adhesive applications for thousands of years, but they were replaced with fossil-based adhesives due to cost and performance. The use of protein-based adhesives is limited due to their poor water resistance and high viscosity, and extensive research is being conducted to improve the performance of protein adhesives. Soybean proteins are the focus today, but other protein sources are also being investigated such as wheat gluten, peas, and lupins. Tannin is another bio-based polymer that has been extensively explored for wood adhesive applications. Tannins are polyhydroxypolyphenols that can be extracted from bark, leaves, and fruits of plants such as pine, oak, and maple. Tannins have been used industrially as wood adhesives for particleboards and laminates in locations where they are readily available, for example South Africa and Australia. Tannins are very reactive and can be used as a substituent to phenol, but the market for tannin-adhesives is limited due to tannins low availability in most parts of the world, and the variety of tannin sources affecting its reactivity. Tannin adhesives also suffer from a high viscosity.

Another bio-based polymer that has been suggested as a binder in wood adhesives is lignin, which is found in lignocellulosics including wood, grass, agricultural residues etc. Lignin is built up of an aromatic structure of phenolic derivatives and, in contrast to tannins, it is available in very large amounts at a relatively low cost being a by-product from the pulp industry. When separated from cellulose, lignin is partially degraded and needs to be further polymerized to develop adhesive properties. Lignin adhesives have so far shown limited industrial use due to their low reactivity towards formaldehyde and other components during curing, due to the low amount of phenolic rings and the absence of polyhydroxy phenyl rings. The low reactivity is the main subject of research for improving the performance of lignin-based adhesives.

Natural gums, like hemicelluloses, belong to the group of polysaccharides and have similar structure, but gums usually have a much higher molecular weight than wood hemicelluloses. Gums can be obtained from several sources, for example seeds or bacteria. Like hemicelluloses, gums are indigestible, but they are used in the food and pharmaceutical industries as thickeners, colloidal stabilizers, and flow controllers. They are also used in other fields such as the textile, printing, cosmetics, and mining industries, and in various types of adhesives, such as pressure-sensitive tape, denture and medicinal adhesives, paper adhesives, pharmaceutical tablet binders, and label pastes. However, little work has been done on utilizing gums as wood adhesives. Xanthan gum, derived from bacteria, has been studied as a binder in wood adhesives and it shows a dry bond strength comparable to that of a PVAc-based adhesive.

The adhesive clearly needs good bonding strength and many of the adhesives today suffer from low adhesiveness especially in humid climates. Therefore there is a need for adhesives that are environmentally friendly, free from hazardous compounds, are easily applied and provides good adhesiveness and bond strength.

SUMMARY OF THE INVENTION

The object of the present invention is to overcome the drawbacks of the prior art and present a green wood adhesive that not only provides high bond strength but also is applicable under hot and humid conditions.

In a first aspect the present invention relates to an adhesive comprising a polysaccharide or a residual fraction from a pulping process comprising polysaccharide, optionally lignin, and an amine-functional polymer such as polyvinyl amine, polyethylene imine or chitosan; wherein the weight ratio between the polysaccharide and the amine-functional polymer is from 1:4 to 4:1; wherein the polysaccharide is hemicellulose or gum and with proviso that the composition has a pH of 6 or less when the amine-functional polymer is chitosan.

In a second aspect the present invention relates to a particle board comprising the composition according to the present invention.

In a third aspect the present invention relates to a veneer comprising the composition according to the present invention.

In a fourth aspect the present invention relates to the use of locust bean gum for particleboards.

In a fifth aspect the present invention relates to particleboards comprising locust bean gum.

In a sixth aspect the present invention relates to an adhesive aqueous composition comprising a polysaccharide wherein the polysaccharide is locust bean gum or a residual fraction from a pulping process comprising polysaccharide wherein the polysaccharide is hemicellulose, optionally lignin, and an amine-functional polymer such as polyvinyl amine, polyethylene imine or chitosan; wherein the weight ratio between the polysaccharide and the amine-functional polymer is from 1:4 to 4:1; and with proviso that the composition has a pH of 6 or less when the amine-functional polymer is chitosan.

In a seventh aspect the present invention relates to a method of preparing a particle board comprising:
providing wood particles with an initial water content;
providing chitosan;
providing hemicellulose or a residual fraction from a pulping process comprising polysaccharide wherein the polysaccharide is hemicellulose;
mixing the wood particles and the chitosan forming a first mixture;
adding an acid, preferably by spraying, to the first mixture to obtain a pH of 6 or less and mixing forming a second mixture;
adding the hemicellulose or the residual fraction to the second mixture and mixing forming a third mixture;
drying the third mixture to a second water content;
pressing the third mixture at a first pressure to obtain a product; and
drying the product to obtain the particle board.

In an eight aspect the present invention relates to a method of preparing a particle board comprising:
providing wood particles with an initial water content;
providing the adhesive composition wherein the polysaccharide is locust bean gum;
mixing the wood particles and the locust bean gum forming a first mixture;
adding water, preferably by spraying, to the first mixture and mixing forming a second mixture;
drying the second mixture to a second water content;
pressing the second mixture at a first pressure to obtain a product; and
drying the product to obtain the particle board.

All the embodiments disclosed herein may be used or combined with all the aspects of the present invention unless stated otherwise.

DETAILED DESCRIPTION OF THE INVENTION

Figure 1:
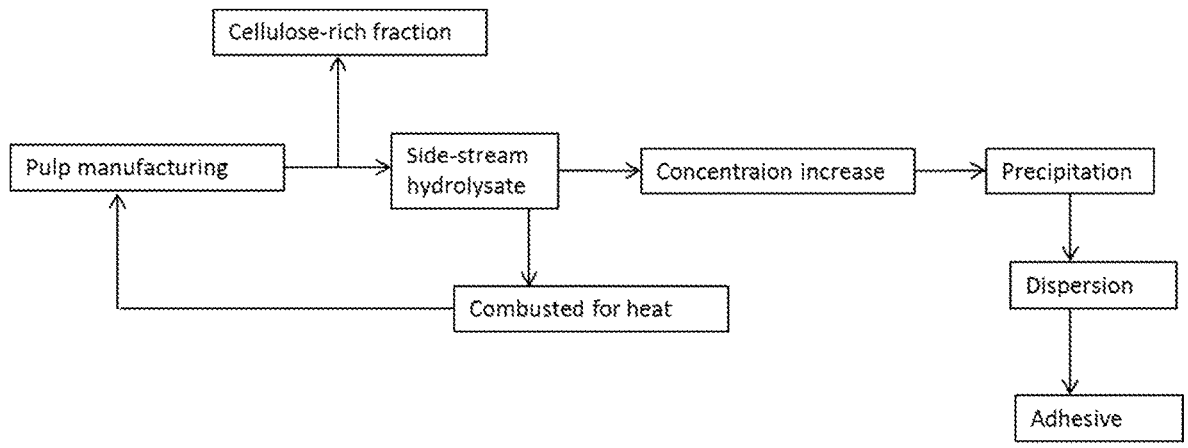
FIG. 1 schematic overview of the invention and how it relates to the side-stream production at a pulp mill.

Water dispersions of hemicelluloses and other polysaccharides was prepared and evaluated as adhesives for bonding different wood substrates together. The dry bond strength, water resistance, and heat resistance were investigated by exposing the bonded wood specimens to different conditioning methods and thereafter measuring the tensile shear strengths. As a replacement, the bio-based wood adhesive must possess similar or even better properties than the fossil-based adhesives. A commercial poly(vinyl acetate) (PVAc) wood adhesive used for indoor applications was used as a reference. Wood hemicelluloses themselves do not have sufficient bonding performance probably because their low molecular weight does not provide adequate strength and makes the adhesive too brittle. What the present inventors showed was that hemicellulose in combination with poly(vinyl amine) showed promising results superior those of PVAc. A fully bio-based adhesive comprising of hemicellulose and chitosan, another bio-based polysaccharide, obtain surprisingly good bonding performance especially with regard to water resistance. Gums, polysaccharides with similar structures to those of hemicelluloses but with higher molecular weights, have also been studied and locust bean gum dispersions without any modification showed a very good bonding performance with high dry bond strength and water resistance on a par with those of PVAc and a heat resistance superior to that of PVAc. Chitosan has very good adhesive properties especially with regard to water resistance, but the high viscosity of the chitosan dispersion makes it difficult to apply on its own.

The Composition

The present adhesive composition, the green wood adhesive, is an aqueous composition comprising a polysaccharide preferably locust bean gum or a polysaccharide and an amine functional polymer. The polysaccharide is hemicellulose or gum and the hemicellulose may be part of a residual fraction from a pulping process. This residual fraction may comprise besides hemicellulose also lignin, cellulose and residues from the pulping process. An advantage of using a residual fraction from a pulping process is that no or only limited purification or isolation steps are required. This reduces the price of the product and reduces the environmental impact the preparation of the adhesive has. The hemicellulose may preferably have a molecular weight ($M_w$) of 5 kg/mol to 60 kg/mol such as 25-50 kg/mol. In one embodiment the hemicellulose is xylan. The gum may preferably have a molecular weight of 100-50.000 kg/mol such as 200-2000 kg/mol or 300-500 kg/mol. A high molecular weight is believed to be an important factor for the adhesive properties. The present adhesive composition also improves the heat resistance both when using locust bean gum alone but also when using a residual fraction from a pulping process.

The hemicelluloses can be recovered from a forestry process. Depending on the requirements of characteristics such as composition, molecular weight, and purity, different extraction, fractionation, and purification stages are possible. For economic reasons it is beneficial if the product is not sensitive to variations in characteristics. Each fractionation and purification step will increase the cost. Hemicelluloses can for example be recovered from the process water of existing forestry processes such as thermo-mechanical pulping, TMP. The hemicelluloses in the process water are very dilute and to isolate them separation techniques such as ultrafiltration are necessary. Hemicelluloses can also be obtained by the pre-hydrolysis of wood prior to the pulping process of, for example, Kraft or dissolving pulp. The process water obtained from the hydrolysis is called "wood hydrolysate" and is rich in hemicelluloses, but it may also contain small amounts of lignin and other wood constituents. In one embodiment the adhesive composition comprises wood hydrolysate or the residual fraction from a pulping process is wood hydrolysate. The hemicellulose of the present invention may preferably be from hard wood or soft wood. In one preferred embodiment the hemicellulose is xylan.

The amine functional polymer may be any suitable polymer comprising amine functional groups. In one embodiment the amine functional polymer is selected from polyvinyl amine, polyethylene imine and chitosan. The amine functional polymer such as polyvinyl amine and polyethylene imine may have a molecular weight of 300-400 kg/mol and 50-60 kg/mol respectively.

Without being bound by theory it is believed that an acidic pH facilitates a better dissolution of the chitosan and reduces the risk for precipitation of the chitosan. The latter is believed to hamper the bonding properties of the adhesive. Therefore, when using chitosan, the pH of the composition should be 6 or less, preferably 5 or less. In one embodiment the pH of the composition is 2 to 5, or 3 to 4.5, or 4.0 to 4.5. A lower pH also allows a higher dry content in the chitosan containing adhesive composition. By using chitosan as the amine functional polymer the adhesive becomes even greener, more environmentally friendly.

When preparing the composition comprising chitosan an aqueous composition of polysaccharide may first be prepared where after an acid is added lowering the pH to for example 2 or 3. When adding the chitosan the pH in the composition is then raised to the final pH of the composition.

In order to obtain sufficient adhesive properties the weight ratio between the polysaccharide and the amine functional polymer should be from 1:4 to 4:1. In one embodiment the weight ratio is preferably from 1:3 to 3:1, or 1:2 to 2:1, or about 1:1.

To allow the adhesive composition to be easily spread the dry content of the adhesive composition should preferably not be higher than 35 wt %. In one embodiment the dry content is 30 wt % or less, or 25 wt % or less. In one embodiment the dry content is 10-30 wt %, or 15-25 wt %, or around 20 wt %. The present invention allows higher dry contents and still be spreadable. Compositions with pure chitosan, no amine functional polymer, are not spreadable at high dry contents but the present inventors have shown that the addition of polysaccharide makes it spreadable and that even higher dry contents may be used.

When the composition comprises gum the dry content is preferably 6-15 wt % such as 8-12 wt % or 10-11 wt %.

The viscosity of the composition should be such that it may easily be applied to a surface but not too fluidic. Preferably the viscosity should be 200-500 PaS such as 250-350 PaS.

The composition may comprise any suitable additive such as commercially available additives. In one embodiment the composition comprises urea. Urea is believed to act as a scavenger for formaldehyde which may be produced or released from the wood during use of the present composition. The amount of urea is preferably 5-15 wt % based on the dry content of adhesive mixture more preferably 8-12 wt %.

Preparing the Adhesive Composition

The compositions according to the present invention may be prepared by adding polysaccharide such as hemicellulose or gum to an aqueous solution such as water to obtain a dispersion. The dispersion is then mixed using any suitable mean such as stirring, shaking or vortex.

When using chitosan an acid is also added to the aqueous solution in an appropriate amount in order to obtain the wanted pH. In one embodiment the pH is 5 or less preferably 2 to 5, or 3 to 4.5. In one preferred embodiment the pH is 4.0 to 4.5. The acid may be but is not limited to acetic acid, hydrochloric acid or sulfuric acid. Preferably the acid is added to the aqueous solution prior to the addition of the chitosan.

The mixing may be done at elevated temperatures such as 40° C.-80° C. but also at room temperature.

Figure 2:
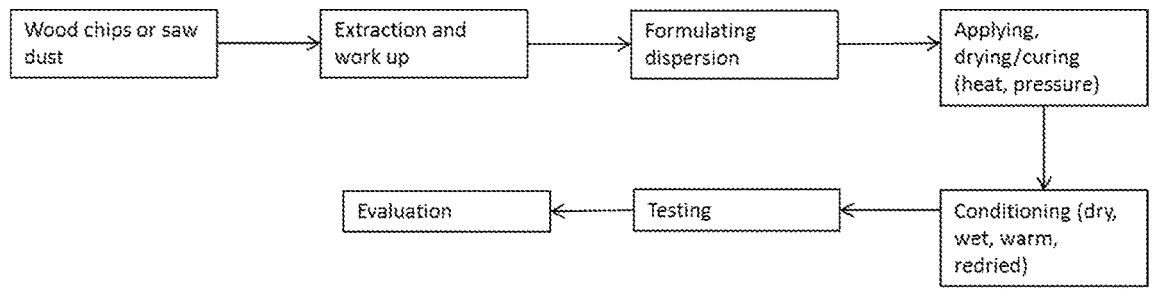
FIG. 2 schematic overview showing the process flow from wood chips to tested wood veneers. The first step (extraction) mimics the first step in the pulping process.

An advantage of the present invention when using hemicellulose is that the process of preparing the adhesive composition may be integrated into the pulp mill process as schematically shown in FIGS. 1 and 2.

Preparing of Products

The present particleboard and method of preparing the same is believed to be significantly different from prior art: The hot pressing-step today needs to be conducted at a sufficiently high temperature to cure the system and ensure sufficient adhesion but not too high temperature since a too high temperature is observed to impair the adhesive bond strength. Also standard particleboard manufacturing often only allows low amount of water in the particles while the present inventors have shown that a too low level of water is detrimental to the adhesive performance.

Therefore the present invention allows particle board preparation at much lower temperatures (press temperature), down to 150° C., and allows higher water content in the particle. The latter is beneficial also since then any drying step required today can be shortened or even removed. In one preferred embodiment the temperature during the hot pressing is 150-200° C. and the press pressure (first pressure) may be 4-8 metric ton preferably around 6 metric ton. In one embodiment the temperature is 170-190° C. preferably 185° C. The initial water content of the wood particles, such as in saw dust, when preparing the particle board according to the present invention may be 20-50 wt % preferably 35-40 wt %. Using a higher initial water content improves the final particle board properties. The particleboard may contain 10-30 wt % of adhesive (based on the particles dry weight) such as 15-20 wt % or around 18 wt %. When the composition comprises gum the dry content of the adhesive is preferably 6-15 wt % such as 8-12 wt % or 10-11 wt %. Before hot pressing the mixture of particles (third mixture) and adhesive may be left to dry or is preferably dried in an oven at 50° C. to a water content (second water content) of 25-35 wt % preferably 28-32 wt % such as around 30 wt %. The particles may be wood particles preferably from hard wood or soft wood. The particle size or particle size distribution is preferably 1 mm or larger but preferably 15 mm or smaller, preferably in the range of 2-10 mm more preferably 3-7 mm. The method according to the present invention comprises mixing the amine functional polymer, preferably chitosan, or locust bean gum with the wood particles forming a first mixture followed by addition of the acid, to the wanted pH, or water when using locust bean gum forming a second mixture. Then the hemicellulose or residual fraction (hydrolysate) is added to the second mixture forming the third mixture. Each first to third mixture is preferably mixed using any suitable mixing technique. When using locust bean gum addition of hemicellulose or residual fraction is optional. Said third mixture, or second mixture when using locust bean gum, is there after pressed at a first pressure during heating (press temperature) to obtain the particle board. The obtained particle board is then dried to the final particle board product. This method results in particle boards with better bonding properties. The acid is preferably sprayed on or to the first mixture.

Panels may be prepared by applying the adhesive composition on one or both surfaces of the material and then pressed together. An advantage of the present invention is that the pressing may be done at room temperature but the temperature may be 40-140° C. such as 110-130° C. or around 120° C. and the applied pressure may be 0.5-2 MPa. The total amount of adhesive may be 100-500 g/m$^2$ such as 300-400 g/m$^2$ (150-200 g/m$^2$ on each surface).

When adhering veneers together the adhesive composition is applied on one or both surfaces of the veneer and then pressed together. An advantage of the present invention is that the pressing may be done at room temperature but the temperature may be 40-140° C. such as 110-130° C. or around 120° C. and the applied pressure may be 0.5-2 MPa. The total amount of adhesive may be 100-500 g/m$^2$ such as 300-400 g/m$^2$ (150-200 g/m$^2$ on each surface).

The adhesive may be added in more than one layer such as two, three or four layers. Before applying each additional layer the previously applied layer may be allowed to dry or cure for a suitable period of time.

In order to obtain sufficient adhesive properties, in any product, the weight ratio between the polysaccharide and the amine functional polymer should be from 1:4 to 4:1. In one embodiment the weight ratio is preferably from 1:3 to 3:1, or 1:2 to 2:1, or about 1:1. When using locust bean gum and hemicellulose or residual fraction the weight ratio is preferably 1:3 to 3:1, or 1:2 to 2:1, or more preferably about 1:1

In one preferred embodiment the obtained products are conditioned according to modified versions of European Standards EN204 and EN14257.

Applications

The present composition may be used to prepare particleboards, veneer, panels and so on.

For particleboards the water content of the particles and the amount of the adhesive are two significant parameters for board formation, as well as pressing conditions (temperature and pressure). Today particleboards are prepared with 7-10 wt % adhesive, based on particles, and the water content of the particles is kept very low before hot-press in order to avoid steam explosion. Often the water content in the particles is less than 10 wt %. The present invention uses much higher amount of adhesive, such as 15-25 wt % based on the amount of particles, but since the particle board process according to the present invention can be done at lower temperatures the dryness of the particles does not have to be so low. The water content of the particles may be 20-40 wt % such 25-35 wt % preferably 28-32 wt % or around 30 wt %. Press pressure is 4-8 metric ton preferably 6 metric ton (first pressure) and pressing temperature is between 150-200 degree C.

EXAMPLES

Example 1

Materials and Chemicals

Polysaccharides

Locust bean gum (LBG) from *Ceratonia siliqua* seeds, xanthan gum (XaG) from *Xanthomonas campestris*, guar gum (GG), xylan (X) (90% HPLC) from beech-wood, chitosan (CS), low molecular weight, (product number: 448869) with a viscosity of 92 mPas and degree of deacetylation of 77% were purchased from Sigma Aldrich. Tamarind gum from Innovassynth (TGInn) containing ~85 wt % xyloglucan and deoiled tamarind gum from Premcem Gums (TGPrem) containing ~40 wt % xyloglucan were kindly supplied by Cellutech AB, Sweden. Brown liquor (a side stream obtained from the sulfite process where pulp is produced) was kindly supplied by Domsjö Fabriker AB, Sweden. The brown liquor contained mainly lignin, sugars and polymeric sugars with trace elements of manganese, calcium and iron. Hardwood hydrolysate (HW) was kindly supplied by Holmen in collaboration with MoRe Research, and ultrafiltered softwood hemicellulose (SW) was kindly supplied by Stora Enso, Kvarnsveden, Sweden.

Additives Poly(vinyl alcohol) (PVA), Poval 217, was obtained from Kuraray. Lupamin® 9095, 20 wt % solution of poly(vinyl amine) (PVAm, P) with a molar mass of 340 kg mol$^{-1}$ was supplied by BASF. 1,2,3,4-butanetetracarboxylic acid (BTCA), toluene-4-sulfonic acid monohydrate (pTSA), and citric acid (CA) were purchased from Sigma Aldrich. Glyoxal (G), 40% w/w aq. soln. was purchased from Alfa Aesar.

Hexa(methoxymethyl)melamine (HMMM, H), was kindly supplied by Becker Industrial Coatings AB. Trimethylolpropane triacetoacetate (AATMP, A) was purchased from Lonza. Proxel XL-2 (biocide) was obtained from Arch UK and Rocima 520S (fungicide) from Dow.

Other Chemicals

Vinyl acetate (VAc) containing 3-20 ppm hydroquinone as inhibitor, ≥99%, acetic acid ReagentPlus®, ≥90%, ammonium cerium(IV) nitrate (CAN) ≥99.99% trace metals basis, potassium persulfate (KPS) ACS reagent, 99.0% were purchased from Sigma Aldrich. Hydrochloric acid, for analysis, fuming, (37%) solution in water, was purchased from Fisher Scientific.

Wood Samples

Wood veneers and beech-wood panels were kindly supplied by AkzoNobel Adhesives AB.

Adhesive Reference

Cascol®3304, a poly(vinyl acetate)-based wood adhesive was kindly supplied by AkzoNobel Adhesives AB and used as a reference denoted PVAc. Cascol is a thermoplastic wood adhesive classified as a D2 adhesive according to the EN 204 standard.

Preparation of Dispersions

Gum Dispersions—Large Scale

Water dispersions (6 wt %) of locust bean gum (LBG), guar gum (GG), tamarind gum (TG) (from Innovassynth and Premcem), and xanthan gum (XaG) were prepared by dispersing 24 g gum in 380 mL deionized water at 60° C. in an oil bath for 6 h and stirring (150-200 rpm) using an overhead stirrer. TG from Premcem (48 g) was also dispersed in deionized water (380 mL) to prepare an 11 wt % dispersion by the same procedure and LBG (24 g) was further dispersed in brown liquor (380 mL) by the same procedure. To prevent mold growth, 0.15 wt % solutions of Proxel XL-2 (biocide) and Rocima 520S (fungicide) were added when the dispersions had cooled to room temperature. These gum dispersions are presented in Table 1. The dispersions were used to bond wood veneers and wood panels together.

TABLE 1

Gum dispersions

| Gum | Abbreviation | Dry content [wt %] | Dispersing agent |
|---|---|---|---|
| Locust bean gum | LBG | 6 | Deionized water |
| Locust bean gum | LBG-brown liquor | 12 | Brown liquor |
| Guar gum | GG | 6 | Deionized water |
| Xanthan gum | XaG | 6 | Deionized water |
| Tamarind gum (Innovassynth) | TGInn | 6 | Deionized water |
| Tamarind gum (Premcem) | TGPrem | 6 | Deionized water |
| Tamarind gum (Premcem) 11 wt % | TGPrem | 11 | Deionized water |

Xylan Dispersions—Small Scale

A water dispersion (20 wt %, 5 g total) was prepared by dispersing xylan from beech-wood (1 g) in deionized water (4 mL). The dispersion was stirred with a spoon and a vortex for approximately 2 min. Xylan dispersions (5 g total) were prepared with dispersing agents (0.8, 2.4, 4 or 5.6 wt %) and/or crosslinkers (0.8 or 4 wt %). PVA and PVAm were evaluated as dispersing agents and glyoxal, HMMM, CA, BTCA, and AATMP were evaluated as crosslinkers. All the dispersions contained 20 wt % xylan but had different total dry contents. PVA was dissolved and PVAm was diluted in deionized water. Thereafter, xylan (1 g) was added to the dispersing agent solution and stirred with the same procedure as mentioned above and finally the crosslinker was added to the mixture and the dispersion was stirred again by the same procedure. Reference dispersions were prepared by mixing dispersing agents and crosslinkers alone. The dispersions and their various compositions are presented in Table 2. The sample names are abbreviations of the components in the dispersions; X=xylan, G=glyoxal, H=HMMM, A=AATMP. The number following each abbreviation is the wt % of each component in the final dispersion, exemplified by X20-PVA4—where X20 means 20 wt % xylan, PVA4 means 4 wt % PVA, and 76 wt % water. Small-scale dispersions were used to bond wood veneers together.

Xylan Dispersions—Large Scale

Xylan dispersions that were found to have a promising bonding performance were further studied on a larger scale. Xylan dispersions (60 g total) were prepared with dispersing agents (PVA and PVAm) and crosslinkers (glyoxal, HMMM or AATMP). All the dispersions had 20 wt % of xylan but different total dry contents. The same procedure was used as for the small scale dispersion but an overhead stirrer was instead used to stir the dispersions for 15 min at 60 rpm at room temperature. The large-scale dispersions were used to bond wood panels together.

TABLE 2

Xylan dispersions with dispersing agents and/or crosslinkers.

| Dispersion | Xylan [wt %] | Crosslinker [wt %] | Dispersing agent [wt %] |
|---|---|---|---|
| X | 20 | | |
| X-PVA | 20 | | 4 |
| X-G | 20 | 4 | |
| X-H | 20 | 4 | |
| G-PVA | | 0.8, 4 | 2.4, 5.6 |
| H-PVA | | 0.8, 4 | 2.4, 5.6 |
| PVAm | | | 20 |
| G-PVAm | | 0.8, 4 | 2.4, 5.6 |
| H-PVAm | | 0.8, 4 | 2.4, 5.6 |
| X-PVAm | 20 | | 0.8, 2.4, 4, 5.6 |
| X-G-PVA | 20 | 0.8, 4 | 2.4, 4, 5.6 |
| X-H-PVA | 20 | 0.8, 4 | 2.4, 4, 5.6 |
| X-G-PVAm | 20 | 0.8, 4 | 2.4, 5.6 |
| X-H-PVAm | 20 | 0.8, 4 | 2.4, 5.6 |
| X-A-PVAm | 20 | 0.8, 4 | 2.4, 5.6 |

Pulp-Process-Derived Hemicellulose Dispersions

Figure 23:
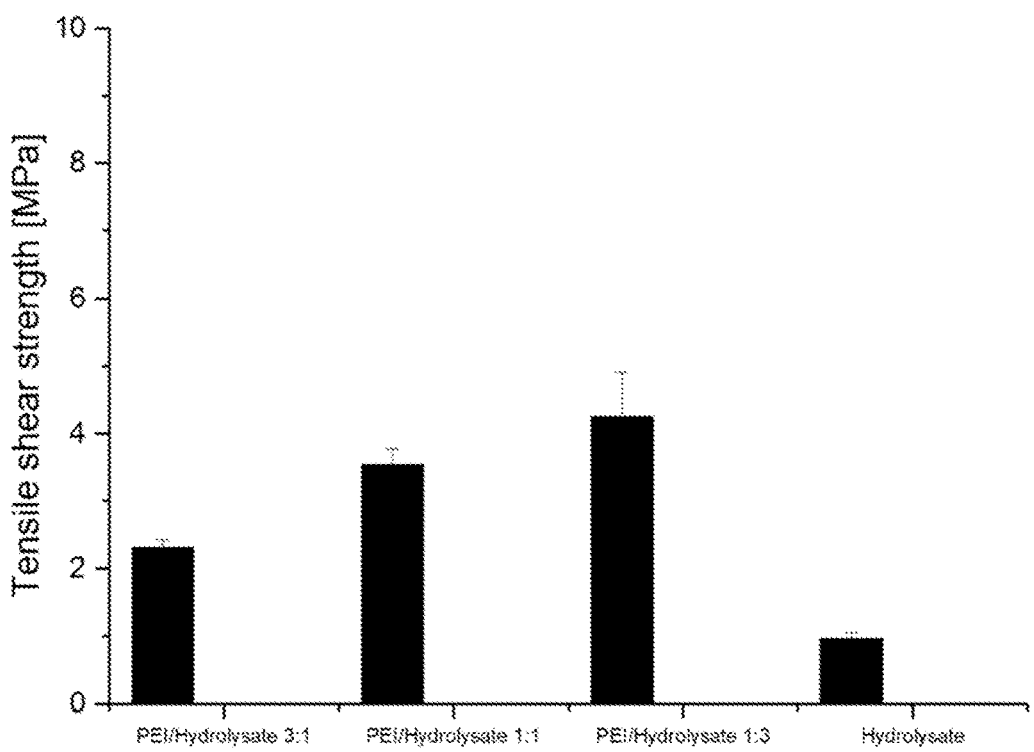
FIG. 23 tensile shear strength (MPa) for hardwood hydrolysate and PEI.
Figure 25:
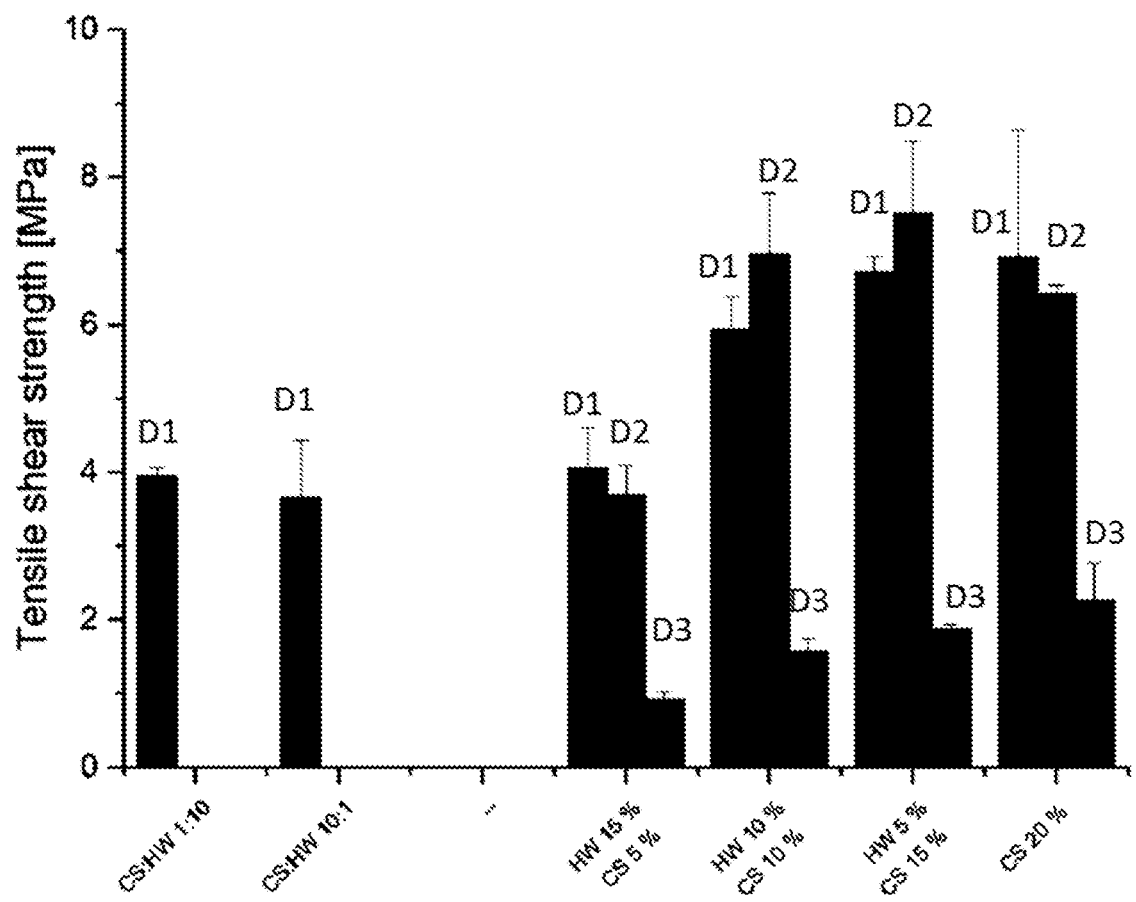
FIG. 25 tensile shear strength (MPa) for chitosan and hardwood hydrolysate.

Water dispersions (4 g in total, 20 wt %) of hemicellulose (xylan from beech-wood (X), hardwood hydrolysate (HW), or softwood ultrafiltrate (SW)) were prepared in combination with PVAm, PEI (polyethylene imine) or chitosan. These dispersions are presented in Table 3 and the tensile shear strength in wood veneers are disclosed in FIG. 23. The dispersions containing PVAm and PEI were prepared not more than 2 h before bonding wood. Hemicellulose and PVAm or PEI blends with the ratios: 15:5, 10:10, and 5:15 were mixed with a spoon and a vortex for approximately 2 min. The preparation of the chitosan dispersions was started one day before the bonding of wood. Chitosan was added to an acetic acid solution (aq) at pH 2, mixed with a spoon and vortexed for approximately 2 min. Thereafter, chitosan was allowed to disperse on a shaking table overnight. Hemicellulose was added in ratios of hemicellulose to chitosan of 15:5, 10:10, 5:15, 1.8:18.2 (Table 3) and blended with a spoon and vortexed for approximately 2 min before bonding wood. The dispersions were used to bond wood veneers together, FIG. 25.

TABLE 3

Dispersions of hemicelluloses:xylan from beech-wood (X), hardwood hydrolysate (HW), and softwood ultrafiltrate (SW) with PVAm (P) or chitosan (CS) and hardwood hydrolysate (HW) with starch (S).

| Dispersion | Hemicellulose [wt %] | PVAm [wt %] | Chitosan [wt %] | Starch [wt %] |
|---|---|---|---|---|
| X | 20 | | | |
| HW | 20 | | | |
| SW | 20 | | | |
| P | | 20 | | |
| CS | | | 20 | |
| X-P | 15, 10, 5 | 5, 10, 15 | | |
| HW-P | 15, 10, 5 | 5, 10, 15 | | |
| SW-P | 15, 10, 5 | 5, 10, 15 | | |
| X-CS | 15, 10, 5 | | 5, 10, 15 | |
| HW-CS | 15, 10, 5 | | 5, 10, 15 | |
| SW-CS | 15, 10, 5 | | 5, 10, 15 | |
| HW:CS | 1.8, 18.2 | | 18.2, 1.8 | |
| HW:PEI | 15, 10, 5 | | 5, 10, 15 | |
| HW:S | 10 | | | 10 |

Starch Dispersion

Figure 24:
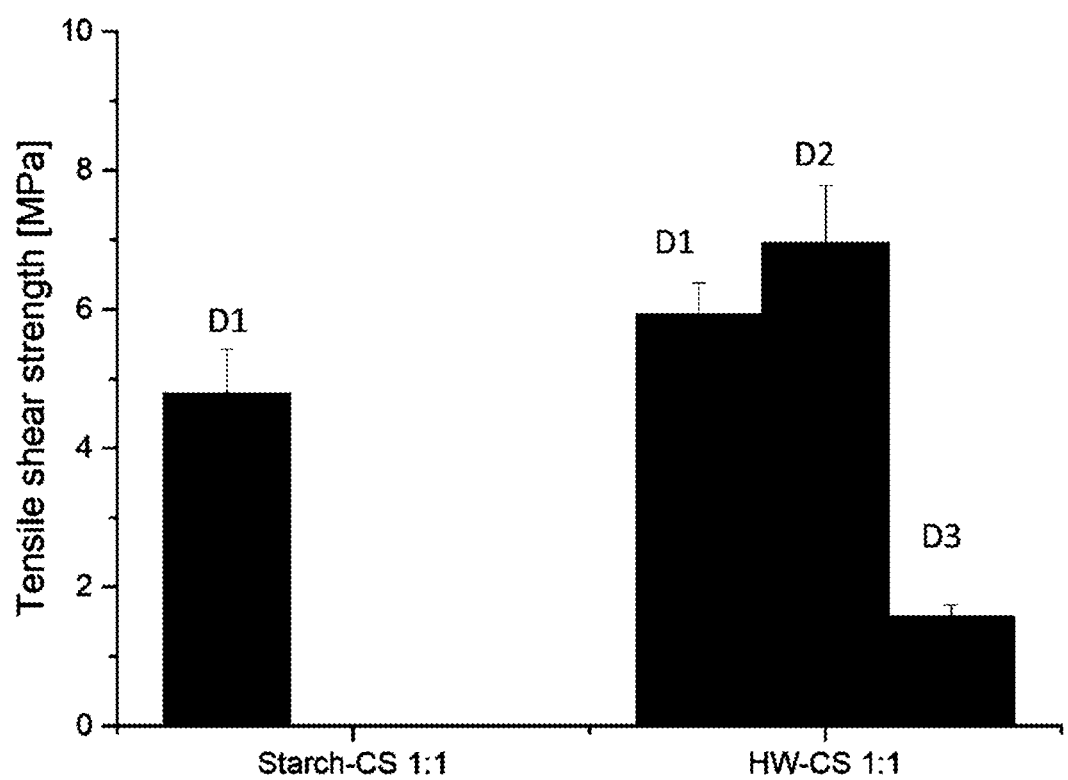
FIG. 24 tensile shear strength (MPa) for starch and chitosan.

Water dispersions (4 g in total, 20 wt %) of starch (from potato) were prepared in combination with chitosan. 35% of starch solution was prepared by dissolving 2 g of starch in water at 60° C. stirring for 20 min and then chitosan solution was added and mixed with starch solution. The preparation of the chitosan dispersions was the same as described above. The weight ratio of starch to chitosan was 1:1. Tensile strength results in seen in FIG. 24.

Specimen Preparation

Veneers: ABES (Automated Bonding Evaluation System)

Beech-wood veneers were conditioned at 20° C. and 65% RH for at least one week before gluing. Veneer strips were punched with dimensions of ~112 mm or 117 mm×20 mm×0.6 mm (length×width×thickness). The edges of two veneer strips, 5 mm overlap, were bonded with a thin glue line using 360 g adhesive m$^{-2}$. The bonded wood strips were hot-pressed at 120° C. and 0.7 MPa for 2.5 min in an Automated Bonding Evaluation System device, ABES II from Adhesive Evaluation Systems. Five samples were prepared for each conditioning sequence.

Multiple Gluing of Veneers: ABES

A multiple gluing was conducted with locust bean gum to increase the amount of adhesive in the bond line to correspond to an adhesive with a dry content of 24 wt %. Adhesive was applied (360 g adhesive m$^{-2}$) on the edges of each pair of veneers and the adhesive layer was allowed to dry at 20° C. and 65% RH for 24 h before another layer was applied. Three layers were applied with subsequent drying overnight. The fourth layer was applied on the fourth day and the veneers were thereafter bonded together and hot-pressed in ABES at 120° C. for 2.5 min at 0.7 MPa. Five samples were prepared for each conditioning sequence.

Veneers: Hot-Press

Beech-wood veneers were punched with dimensions 100 mm×20 mm×1.5 mm and conditioned for at least one week at 23° C. and 50% RH before bonding. Adhesive was applied and spread as a thin glue line (360 g adhesive m$^{-2}$) on the edges of two veneers with 20 mm overlap for a maximum of 2 h after preparation. The bonded veneers were hot-pressed at 120° C. and 1.67 MPa for 2.5 min in a Fontijne Grotnes Lab Pro 400. Three samples were prepared for each conditioning sequence.

Wood Panels

Beech-wood panels with dimensions 400 or 800 mm×135 mm×5 mm were conditioned at 20° C. and 65% RH for at least one week before gluing. The panels were bonded with 360 g adhesive m$^{-2}$ (180 g adhesive m$^{-2}$ on each panel), and hot-pressed at 120° C. and 0.7 MPa for 10 min, or pressed at room temperature for 2 h. Ten samples were prepared for each conditioning sequence.

Conditioning Methods

The bonded wood specimens were conditioned according to modified versions of European Standards EN204 and EN14257 as shown in Table 4.

TABLE 4

Conditioning methods for the bonded wood specimens.

| | Conditioning method | Durability class |
|---|---|---|
| Dry strength | 7$^a$ days in standard atmosphere$^b$ | Dry (D1) |
| Water resistance | 7$^a$ days in standard atmosphere$^b$, 3 h in water at 20 ± 5° C., 7 days in standard atmosphere$^b$ | Redried (D2) |
| Water resistance | 7$^a$ days in standard atmosphere$^b$, 4 days in water at 20 ± 5° C. | Wet (D3) |
| Heat resistance | 7$^a$ days in standard atomsphere$^b$, 1 h in oven at 80° C. | Warm (WATT 91) |

TABLE 4-continued

Conditioning methods for the bonded wood specimens.

| | Conditioning method | Durability class |
|---|---|---|
| Water & heat resistance | 1 day in standard atmosphere[b], 3 h in water at 60° C. | Wet & warm |

[a]1 day for samples evaluated with Instron
[b]Standard atomsphere: 20° C. and 65% RH for wood panels and veneers evaluated with ABES, 23° C. and 50% RH for veneers evaluated with Instron Tensile Shear Strength Measurements Veneers: ABES The tensile shear strength of the veneers was measured using the ABES apparatus with a crosshead speed of 10 mm min$^{-1}$.

Veneers: Instron

The strength of the bonded veneers was measured using an Instron 5566 with a 10 kN load cell and a crosshead speed of 1 mm min$^{-1}$. The measurements were conducted at 23° C. and 50% RH. Bluehill software was used to collect the data. The tensile shear strength was calculated from the maximum force [N] before failure of the bonded veneer divided by the bonded area [m$^2$] (measured with a caliper before the strength was tested).

Panels

The bonded wood panels were conditioned at 20° C. and 65% RH for seven days and cut into test pieces according to the European Standard EN 204 and WATT 91 for the classification of thermoplastic wood adhesives for non-structural applications. The test pieces were conditioned as shown in Table 5. An Alwetron tensile testing machine (model TCT 50, Lorentzen and Wettre, Sweden) was used to measure the tensile shear strength. A speed of 50 mm min$^{-1}$ was used and the maximum force before failure was recorded. Five test pieces were tested for each conditioning method. The minimum values of tensile shear strength that must be reached for the classification of thermoplastic adhesives into different durability classes are presented in Table 5.

TABLE 5

The minimum tensile shear strength values to fulfill the durability classes D1, D2 and D3 according to EN204 and WATT 91 according to EN14257.

| Durability classes | Tensile shear strength [MPa] |
|---|---|
| Dry (D1) | ≥10 |
| Redried (D2) | ≥8 |
| Wet (D3) | ≥2 |
| Warm (WATT 91) | ≥7 |

Film Formation

Dispersions (50 g total) with a dry content of 2.5 wt % were prepared for preparing films. Chitosan was added to an acetic acid solution (aq) at pH 2 and allowed to disperse on a shaking table overnight. Hardwood hydrolysate (HW) was added to the chitosan dispersion and blended with a spoon and vortexed for approximately 2 min. Three different dispersions were prepared with the hardwood hydrolysate (HW) and chitosan (CS) ratios 3:1, 1:1 and 1:3. Reference dispersions (2.5 wt % dry content) of chitosan alone and of hardwood hydrolysate alone were also prepared. The dispersions were poured into three Petri dishes with a diameter of 55 mm and allowed to dry at 23° C. and 50% RH for a week before being analyzed with DMA and FTIR.

Instrumentation

Dynamic Mechanical Analysis (DMA)

The mechanical properties of the adhesive films were studied with a TA instruments DMA Q800 in the tensile mode. Samples from the prepared films were cut out with a scalpel with dimensions of approximately 30×5×0.5 mm. The starting temperature was set to 25° C. where it was held for 5 min before heating at a rate of 3° C. min$^{-1}$ up to 125° C. The frequency was set to 1 Hz.

pH Measurements

The pH of the dispersions was measured with a pH glass electrode (JENWAY) connected to a pH meter (3510 pH meter JENWAY). The measurements were performed directly after the preparation of the dispersions.

Thermogravimetric Analysis (TGA)

Thermogravimetric analysis (TGA) was performed on a Mettler Toledo TGA/DSC1, using STARe software to process the data. The samples were heated from 30 to 400° C. in ceramic cups at a rate of 10° C. min$^{-1}$ under a N$_2$ flow of 50 mL min$^{-1}$.

Viscosity Measurements

The viscosity of the gum dispersions was measured 24 h after preparation with a strain-controlled dynamic frequency sweep. The measurements were performed in a TA AR2000 rheometer using 25 mm parallel plates. The frequency was set from 1 rad s$^{-1}$ to 500 rad s$^{-1}$ using 25% strain. All the measurements were conducted in triplicate.

Results and Discussion

The possibility of using hemicelluloses and other polysaccharides in wood adhesives has been evaluated in this work. Dispersions of different gums, commercial xylan, hemicellulose-rich liquids, and chitosan have been prepared and the bonding performance of those has been studied on different types of wood substrates.

Gum Dispersions

Different gums: locust bean gum (LBG), guar gum (GG), xanthan gum (XaG), and tamarind gum (TG) were used. Gums have a molecular structure similar to that of wood hemicelluloses but they have significantly higher molecular weights.

An adhesive with as high dry content as possible is preferred in order to obtain an adhesive joint with an amount of dry adhesive sufficient to provide adequate strength. A high dry content reduces the amount of water that must evaporate during drying, but a high dry content often results in a high viscosity that counteracts the spreadability of the adhesive. The reference PVAc adhesive had a dry content of approximately 50 wt % and a relatively low viscosity. PVAc is easily applied on the substrate since it wets and flows over the wood surface very well.

In order to prepare gum dispersions of reasonable viscosity, 6 wt % of gum was dispersed in water and stirred for 6 h at 60° C. to obtain a stable dispersion. The viscosities of the different gum dispersions are presented in Table 6. All the gum dispersions had a higher viscosity than the PVAc reference, even though the dry content was much lower. LBG and GG exhibited the highest viscosities even though their molecular weights were much lower than those of XaG and TG. TGPrem had a low viscosity similar to that of the PVAc reference, and it was therefore possible to increase the dry content of TGPrem to 11 wt % and still maintain a reasonable viscosity. The viscosity of the gum dispersions was not directly related to the molecular weight; other parameters such as branching and hydrogen bonding also influence the viscosity.

TABLE 6

Molecular weight, dry contents, viscosities, and
pH of the gum dispersions and PVAc reference.

| Dispersion | Molecular weight[a] [kg mol$^{-1}$] | Dry content [wt %] | Viscosity[b, c] [Pa s] | pH[b] |
|---|---|---|---|---|
| LBG | 310 | 6 | 330 ± 22 | 6.4 |
| LBG-brown liquor | 310/1-3[d] | 12 | 420 ± 18 | 6.6 |
| GG | 220 | 6 | 280 ± 14 | 6.5 |
| XaG | 2000[e] | 6 | 43 ± 1.1 | 6.3 |
| TGInn | 2000 | 6 | 54 ± 3.3 | 7.6 |
| TGPrem | 1200 | 6 | 10 ± 0.7 | 6.6 |
| TGPrem 11 wt % | 1200 | 11 | 110 ± 4.6 | 6.6 |
| PVAc, ref | No information | ~50 | 7.3 ± 1.0 | 4.6 |

[a]Data provided by the supplier.
[b]Viscosity and pH were measured 24 h after preperation of the dispersions.
[c]The average viscosity at a frequency of 10 rad s$^{-1}$.
[d]Molecular weight of the brown liquor
[e]The gum had a molecular weight of 2000 kg mol$^{-1}$ but it could also be as high as 50000 kg mol$^{-1}$.

Figure 3:
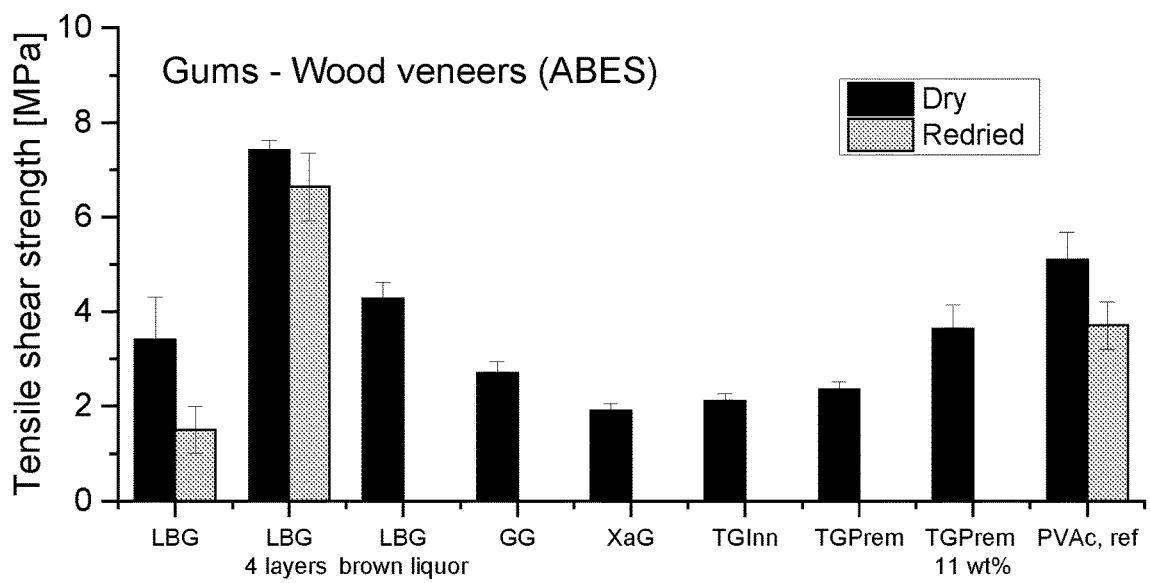
FIG. 3 the tensile shear strength of veneers bonded with gums and pressed at 120° C. for 2.5 min, evaluated with the ABES. Five samples for each conditioning method were evaluated.

The bonding performance of the gum dispersions was evaluated by bonding thin wood veneers together and hot-pressing the specimens at 120° C. for 2.5 min using an ABES device. The tensile shear strengths of the bonded wood specimens are presented in FIG. 3. LBG showed the strongest bonding performance of the 6 wt % gum dispersions, and both the dry and redried wood specimens held together. A dispersion of LBG in brown liquor was also evaluated. Brown liquor is a side stream that is obtained from the sulfite process when pulp is produced. It contains lignin, sugars, polymeric sugars and chemicals from the pulp process. LBG dispersed in brown liquor gave a bond with a higher dry strength than LBG in a water dispersion but all the wood specimens delaminated when immersed in water. The brown liquor contains salts used as reagents during pulping, which may be the reason for the poor water resistance. TG did not show sufficient bonding performance, as all the veneers delaminated in water. An increase in the dry content from 6 wt % to 11 wt % (TGPrem 11 wt %) improved the dry strength but the water resistance was still very poor. LBG showed the best bonding performance of the gums that were tested, but the bonding performance was not as good as that of the PVAc reference. It is however noteworthy that the LBG dispersion had a dry content of only 6 wt % compared to ~50 wt % for the PVAc reference. The same amount of wet adhesive, 360 g m$^{-2}$, was always used and the amount of dry adhesive in the bond line was therefore greater in the samples bonded with PVAc than in the samples bonded with LBG. To overcome this, a multiple gluing of veneers with LBG dispersion was performed. Four layers of LBG was applied on the veneers. Each layer was allowed to dry for 24 h before another layer was applied. The amount of dry adhesive in the final bond line corresponded to an adhesive with 24 wt % dry content. The results showed that multiple gluing significantly improved the tensile shear strength of the bonded wood specimens and was superior to the dry and the redried samples of the PVAc reference. Even though the bond line contained only half the amount of dry adhesive compared to PVAc the tensile shear strength was superior. Furthermore, the tensile shear strength was only slightly reduced after water immersion and redrying, displaying a good water resistance.

Figure 4:
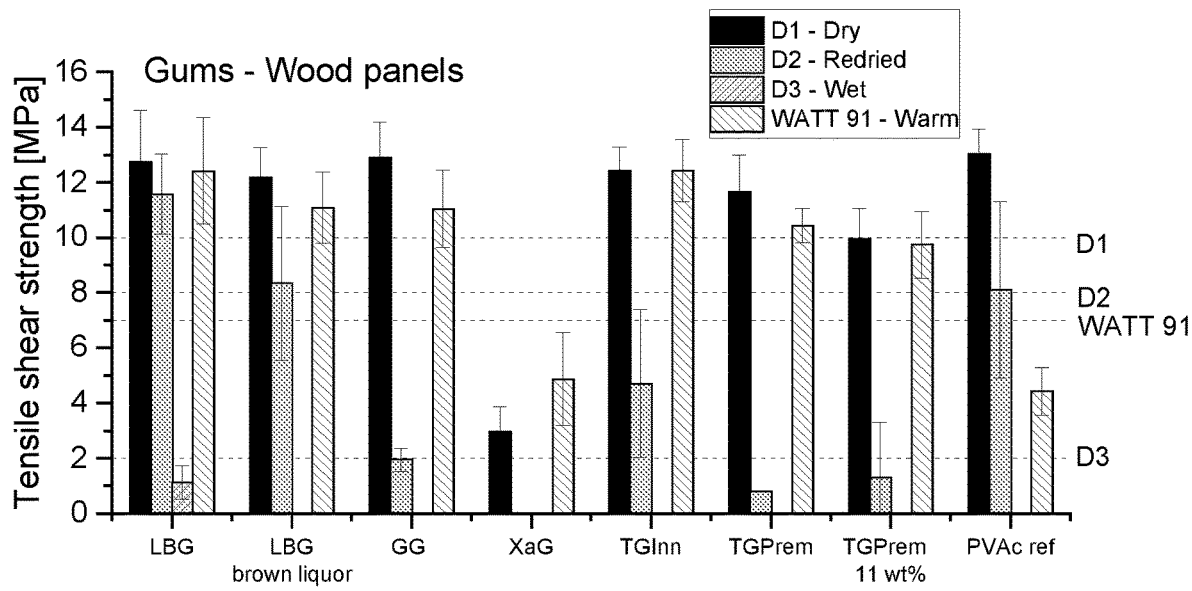
FIG. 4 the tensile shear strength of wood panels bonded with gum dispersions and pressed at 120° C. for 10 min. The bonded wood panels were conditioned according to EN 204 and EN 14257. The horizontal lines at 10, 8, 7 and 2 MPa show the criteria for classification of D1, D2, D3, and WATT91. Ten samples for each conditioning method were evaluated.

The bonding performance of the gum dispersions was further evaluated by bonding wood panels together according to the European Standards EN 204 and EN14257. The ability to spread the adhesive over the wood surface is more important for wood panels, 540 cm$^2$ than veneers, 1 cm$^2$. Bonding veneers with ABES is an easy and rapid way of showing the potential of using the dispersion as wood adhesives, whereas bonding larger wood panels is more relevant for industrial use. The ABES technique shows the adhesion performance, whereas the bonding of larger wood panels is also affected by weaknesses such as poor spreadability and wettability. The gum dispersions were spread out over the wood panels that were then pressed together at 120° C. for 10 min. The tensile shear strengths are presented in FIG. 4, where the horizontal lines show the criteria for the adhesive to be qualified as D1, D2, D3, and WATT91 adhesives. All the dry wood specimens bonded with gum dispersions, with the exception of XaG and TGPrem 11 wt %, exhibited a higher tensile shear strength than the D1 criterion of 10 MPa. Several gums showed a dry strength similar to that of the PVAc reference. Wood specimens bonded with LBG dispersed in water or brown liquor showed the best water resistance and met the D2 criterion of 8 MPa. The other gum dispersions showed poor water resistance and did not classify as D2 adhesives. LBG also showed properties superior to those of the PVAc reference. A D3 adhesive should have a tensile shear strength higher than 2 MPa after been immersed in water for 4 days. All wood specimens had delaminated in water after 4 days except those bonded with the LBG dispersion, but the tensile shear strength of the wet samples was not above 2 MPa and LBG was therefore not classified as a D3 adhesive. The heat resistance of the gums was evaluated by conditioning the bonded wood specimens at 80° C. for 1 h and directly measuring the tensile shear strength. All gums except XaG showed very good heat resistance and fulfill the WATT 91 criterion of 7 MPa. The cyclic structure (glycosyl units), high molecular weight and the possibility for hydrogen bonding probably make the polysaccharides very heat resistant. Wood specimens bonded with the PVAc reference lost their strength when subjected to a high temperature. PVAc is a thermoplastic polymer that softens at higher temperature and can therefore not be classified as a WATT 91 adhesive.

Figure 5:
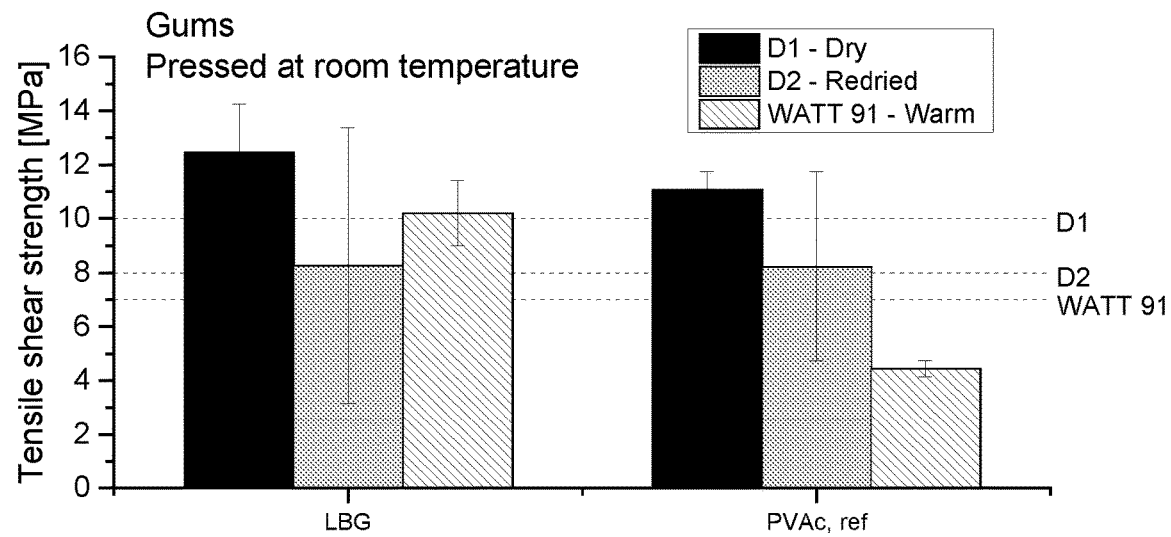
FIG. 5 the tensile shear strength of wood panels bonded with LBG dispersion and PVAc and pressed at room temperature for 2 h. The bonded wood panels have been conditioned according to EN 204 and EN 14257. The horizontal lines at 10, 8, and 7 MPa show the criteria for classification of D1, D2, and WATT91. Ten samples for each conditioning method were evaluated.

LBG showed surprisingly good bonding and fulfilled the requirements for a D2 and WATT 91 adhesive. It exhibited properties superior to those of the PVAc reference. PVAc is normally used at room temperature since it is sensitive to elevated temperature. LBG dispersion and PVAc were therefore used to bond wood panels together which were pressed at RT for 2 h as the normal procedure for PVAc. The tensile shear strengths are presented in FIG. 5. Even though the LBG dispersion contained such a high amount of water, 94 wt %, it was possible to bond the wood at room temperature. The tensile shear strength of the dry samples is superior to that of the PVAc reference and fulfills the D1 requirement. The water resistance of LBG was similar to that of the PVAc and both fulfill the D2 requirements. LBG also fulfilled the WATT 91 requirement showing a very good heat resistance whereas PVAc is sensitive to elevated temperature.

In an attempt to understand why LBG had a better bonding performance than the other gums, films were prepared on glass substrates. LBG formed inhomogeneous films with rough surfaces compared to for example TG films that were very smooth and similar to the PVAc reference films. It was hypothesized that a good film formation was crucial to obtain an adhesive with sufficient properties, but this was clearly not a decisive parameter here. Contact angle measurements were made on the films. All gums showed similar contact angles of 70-80°, but LBG showed much better water resistance when bonded to wood. It was also hypothesized that a higher molecular weight would contribute to a higher tensile shear strength of the adhesive. LBG and GG are both galactomannans with similar structures, but LBG has a higher molecular weight, 310 kg mol$^{-1}$ compared with 220 kg mol$^{-1}$ for GG. Both TG and XaG has higher molecular weights than LBG, but nevertheless they did not exhibit a better bonding performance. LBG and GG are built up of a linear main chain of β-(1→4) linked mannose units. In contrast to glucose and xylose in TG and XaG, mannose has a cis-2,3-diol structure which shows different intermolecular bondings compared with trans-diols as in glucose and xylose units. The cis-diols may provide better interactions with wood compared with trans-diols. The higher density of galactose side chains in GG (every second) compared with LBG (every fourth) may disturb such interactions.

Highlights:
- LBG dispersions showed remarkable properties regarding bond strength, water resistance, and heat resistance and were found to be superior to the PVAc reference, even though the dry content was very low.
- The possibility of pressing both at room temperature and at elevated temperatures broadens the usability of the adhesive.

Xylan Dispersions

A commercial xylan from beech-wood was investigated as a model substance for hemicelluloses derived from pulp processes and water dispersions of xylan were prepared and evaluated as binders. A xylan dispersion with 20 wt % dry content had a reasonable viscosity, and it was used as the base dispersion, denoted X20. A higher dry content could thus be used for the hemicellulose xylan compared to the gums where 6 wt % was used. The molecular weight of xylan was ~10 kg mol$^{-1}$, which is lower than the gums that had molecular weights from 200 kg mol$^{-1}$ up to 2000 kg mol$^{-1}$, (310 kg mol$^{-1}$ for LBG). The viscosity of the hemicellulose dispersions was not measured, since it did not have a decisive effect on the bonding performance of veneers and panels.

Figure 6:
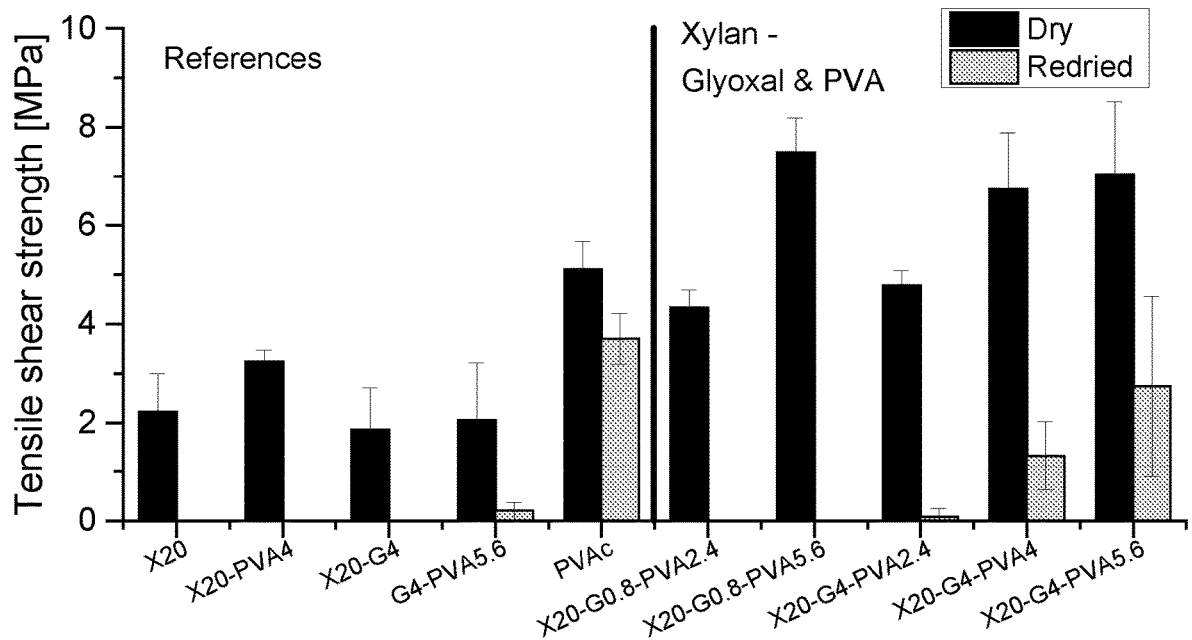
FIG. 6 the tensile shear strength of veneers bonded with xylan dispersed in glyoxal and/or PVA, pressed at 120° C. for 2.5 min, and evaluated with the ABES. Five samples for each conditioning method were evaluated.

Wood veneers were bonded, hot-pressed and, after conditioning, evaluated with the ABES device. Xylan itself was very brittle and did not exhibit sufficient bonding performance probably because the molecular weight was too low. The dry bond strength was only 2.2 MPa and all the samples delaminated when immersed in water. In an attempt to improve the bonding performance, different dispersing agents were added to enhance the film formation and different crosslinkers were added to increase the bond strength. Xylan was dispersed with poly(vinyl alcohol) (PVA) or poly(vinyl amine) (PVAm) as dispersing agents and/or glyoxal, hexa(methoxy-methyl)melamine (HMMM), trimethylolpropane triacetoacetate (AATMP), citric acid (CA), and butanetetracarboxylic acid (BTCA) as crosslinkers. The ambition was to use hemicellulose as the main constituent of the adhesive with only a small amount of additives. None of the additives originate from the pulp industry. The formulated xylan dispersions were used to bond wood veneers together and the tensile shear strengths were evaluated with ABES. PVA was first evaluated as a dispersing agent with promising results. Xylan was easier to disperse in the PVA solution than in deionized water. The dispersion became very smooth and was easy to apply to the wood surface, but the bonding performance of X20-PVA4 was still poor, with only a slightly increase in tensile shear strength for the dry samples, FIG. 6.

Glyoxal is a dialdehyde that possibly can react with the hydroxyl groups of xylan to form hemiacetal groups and crosslink xylan and thereby increase the bond strength, but the addition of glyoxal to xylan, X20-G4, did not affect either the dry bond strength or the water resistance. Glyoxal has a strong tendency to form hydrates, i.e. the addition of water to the carbonyl group, thus the large amount of water in the dispersion probably competes with the crosslinking reaction. The combination, X-G-PVA, showed promising results. With a small addition of PVA and glyoxal, X20-G0.8-PVA2.4, the dry bond strength was 4.3 MPa, almost twice as high as that of X20. With a further increase in PVA, X20-G0.8-PVA5.6, the dry bond strength was nearly doubled again to 7.5 MPa and superior to that of the PVAc, but the water resistance was still poor. An increase in the amount of glyoxal (4 wt %) had no impact on the tensile shear strength of the xylan dispersion containing low amount of PVA, X20-G4-PVA2.4. However, with a greater amount of PVA (4 wt %), X20-G4-PVA4, a high dry strength, was obtained and the water resistance was improved. The veneers held together in water and the tensile shear strength of the redried samples was 1.3 MPa for X20-G4-PVA4, and 2.7 MPa for X20-G4-PVA5.6. X20-G4-PVA5.6 showed a higher dry bond strength than PVAc and the strength of the redried samples was almost as high as that of PVAc. A combination of xylan, PVA and glyoxal is necessary to obtain the required adhesive properties. The mechanism is not fully understood, the good bonding performance could be due to a combination of secondary forces and chemical, covalent bonds. PVA improved the dry strength, and PVA together with glyoxal had a better water resistance. A larger amount of PVA and glyoxal in the xylan dispersions gave both a higher dry content and a higher viscosity. The reaction between hydroxyl groups in xylan and aldehyde moieties in glyoxal can be catalyzed at a low pH. A pH adjustment using HCl from pH 4 to pH 2, of X20-G4 and X20-G4-PVA4, was explored, but the bonding performance deteriorated in both cases (results not shown). The large amount of water probably competes with the reaction.

Figure 7:
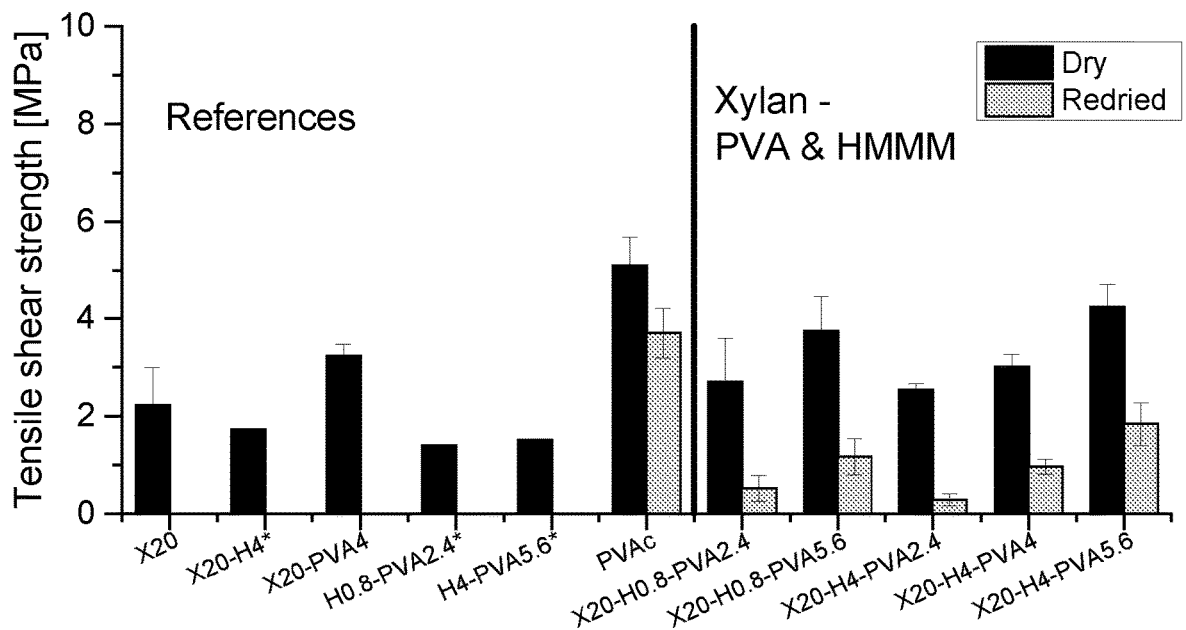
FIG. 7 the tensile shear strength of veneers bonded with xylan dispersed in HMMM and/or PVA, pressed at 120° C. for 2.5 min and evaluated with the ABES. Five samples for each conditioning method were evaluated. *Only one sample was obtained in the press, the rest delaminated.

HMMM was further investigated as a crosslinker for xylan dispersions, since HMMM can possibly react with the hydroxyl groups of xylan through methanolysis. The tensile shear strengths of the veneers bonded with adhesives containing HMMM are presented in FIG. 7. HMMM alone had no positive effect on the xylan dispersion.

The dry bond strength was reduced and most veneers delaminated in water. The combination of xylan, HMMM and PVA, X20-H0.8-PVA2.4, did not improve the dry bond strength significantly but the water resistance was slightly improved and the veneers held together after immersion in water. However, the bonding performance was not nearly as good as that of the PVAc reference. A further addition of PVA improved the bonding performance slightly but the tensile shear strength was still lower than that of the PVAc reference. An increase in HMMM (4 wt %) had no effect on the bonding performance of the xylan dispersion, X20-H4-PVA2.4, but an increase in both HMMM and PVA gave both a higher dry bond strength and water resistance, X20-H4-PVA4 and X20-H4-PVA5.6, although, the bonding performance was not as good as that of PVAc or of the adhesives containing glyoxal. The methanolysis reaction using HMMM can be catalyzed with pTSA, which was evaluated in the dispersions X20-H4 and X20-H4-PVA4, but no effect on the bonding performance was observed (results not shown).

The tri- and tetracarboxylic acids, CA and BTCA were evaluated as crosslinkers for xylan. Water dispersions of xylan in combination with CA or BTCA were prepared and wood veneers were bonded and pressed at 120° C. for 2.5 min. The dry strength of the bonded veneers was slightly improved, but the water resistance remained very poor and all the samples delaminated when immersed in water (results not shown). The esterification would need a higher press temperature, longer reaction time, addition of catalyst, or removal of water; however, that is not preferred for adhesive purposes.

Figure 8:
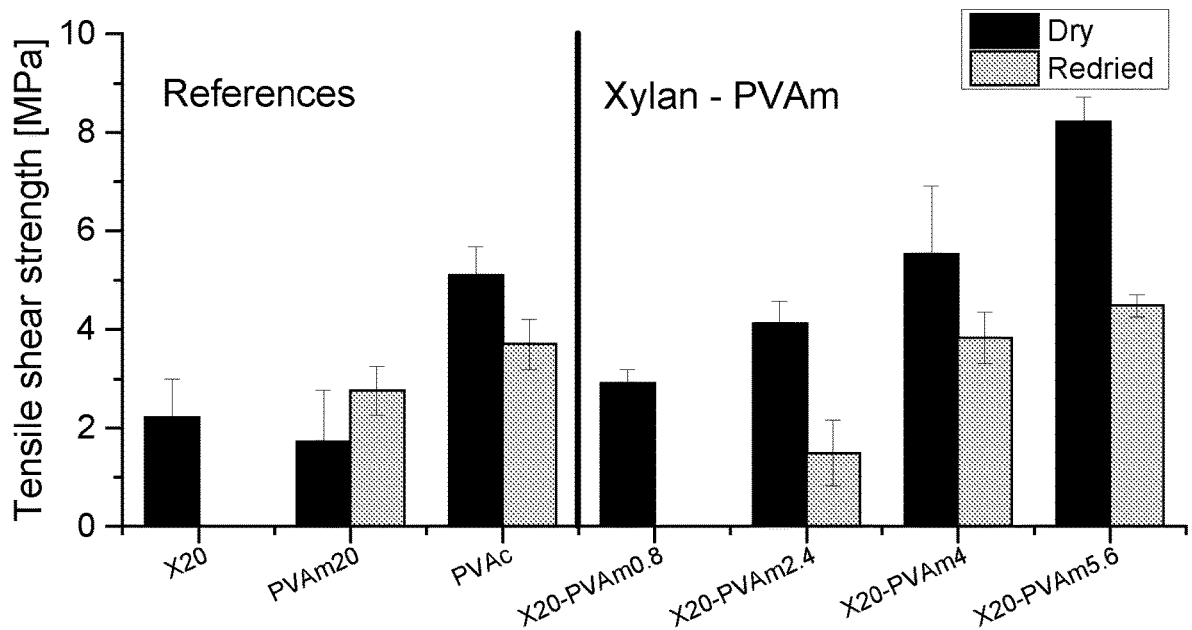
FIG. 8 the tensile shear strength of veneers bonded with xylan dispersed with PVAm, pressed at 120° C. for 2.5 min and evaluated with the ABES. Five samples for each conditioning method were evaluated.

The xylan dispersion was further evaluated with PVAm as dispersing agent. The tensile shear strengths of the bonded veneers are shown in FIG. 8. When PVAm was added to the xylan dispersion, the viscosity increased drastically and the dispersion became gel-like and tacky, possibly due to strong attractive interactions. It was therefore difficult to apply the dispersion homogeneously over the wood surface, in contrast to the dispersions containing PVA. Even though the dispersion did not spread or wet the wood surface satisfactorily, the bonding performance was surprisingly good. Different amounts of PVAm were studied: 0.8, 2.4, 4, and 5.6 wt %. A small addition of PVAm, X20-PVAm0.8 slightly increased the dry bond strength and the bonding performance was considerably improved with a further increase in PVAm amount with regard to both dry bond strength and water resistance. However, a greater amount of PVAm also resulted in a higher viscosity, which made it even more difficult to apply the dispersion on the wood surface. Despite the difficulties in applying the adhesive, X20-PVAm5.6 exhibited a dry bond strength of 8.2 MPa, much superior to PVAc with 5.1 MPa. The water resistance was also remarkable; the tensile shear strength after water treatment was 4.5 MPa which was superior to that of PVAc at 3.7 MPa.

Figure 9:
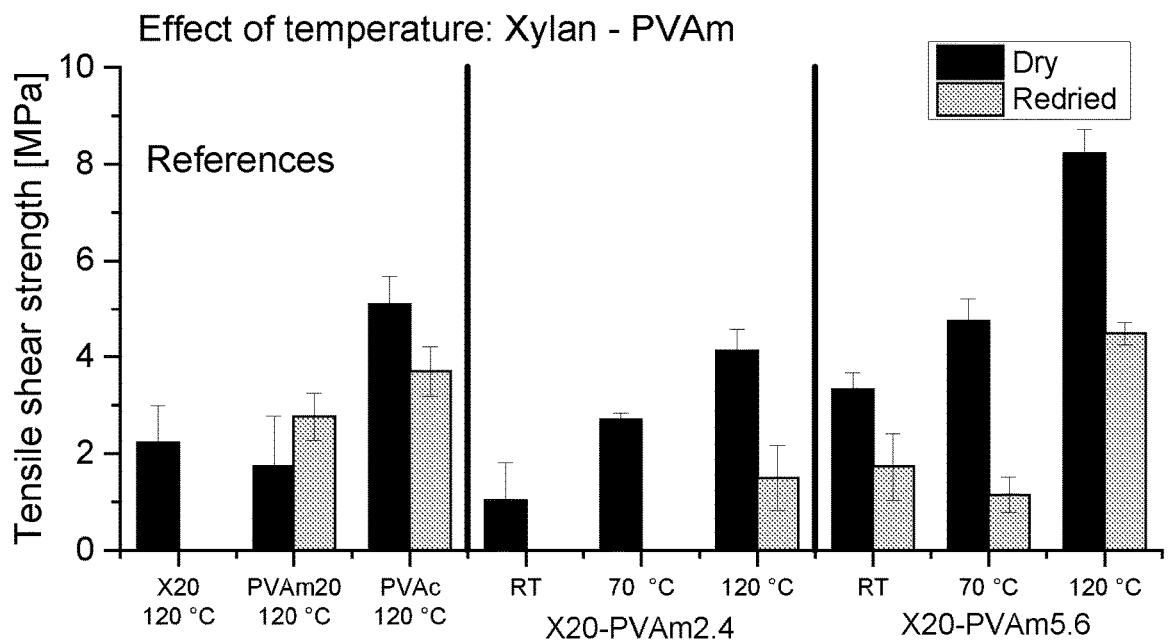
FIG. 9 the tensile shear strength of veneers bonded with xylan dispersed in PVAm, pressed at RT or 70° C. for 2.5 min, and evaluated with the ABES. Five samples for each conditioning method were evaluated.

The xylan dispersions contained a large amount of water, 74-80%, and hot-pressing was therefore mainly used to enhance water evaporation during drying. For environmental and economic reasons, it would be beneficial to press at a lower temperature, preferably room temperature. Because of the promising results with xylan in combination with PVAm, we investigated lower pressing temperatures. Wood veneers were bonded with X20-PVAm2.4 and X20-PVAm5.6 and pressed at 70° C. and room temperature for 2.5 min, and the tensile strengths are presented in FIG. 9. Even though the dispersions contained such a high amount of water (74-80 wt %) the veneers held together. However, the bonding performance was poorer for both dispersions when a lower press temperature was used. Veneers bonded with X20-PVAm2.4 and pressed at 70° C. or room temperature resulted in a much lower dry bond strength and the water resistance was not retained. The bond strength of X20-PVAm5.6 also deteriorated when it was pressed at lower temperatures, but the dry bond strength was still on a par with that of PVAc when pressed at 70° C. However, the bond strength of the redried samples was lower than with PVAc.

Figure 10:
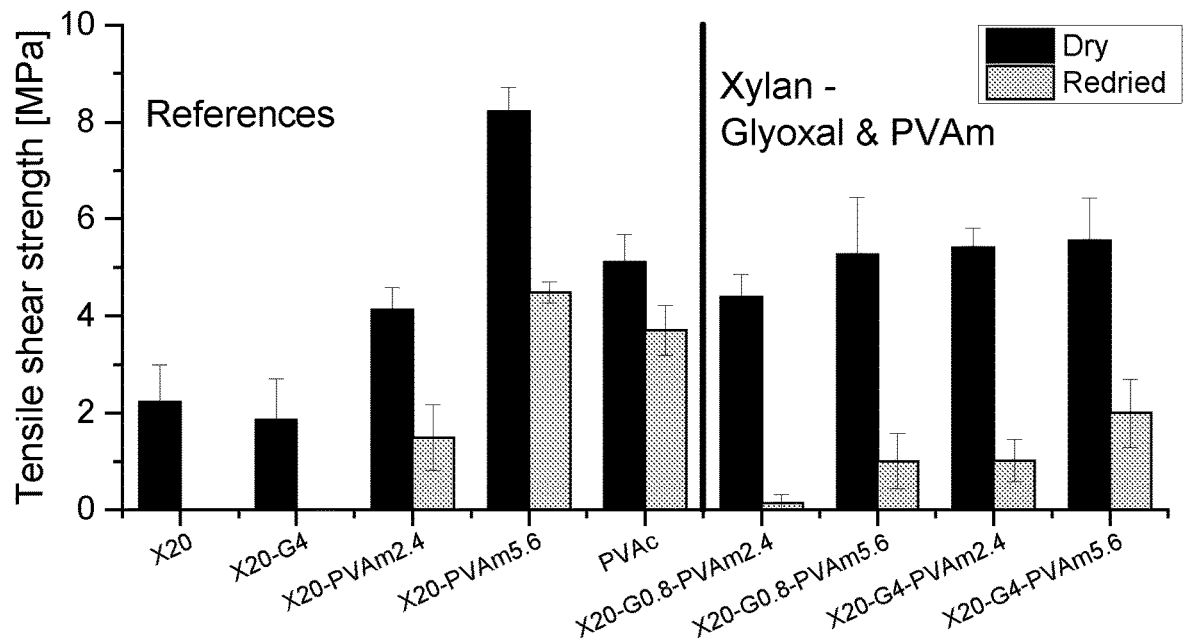
FIG. 10 the tensile shear strength of veneers bonded with xylan dispersed in glyoxal and/or PVAm, pressed at 120° C. for 2.5 min and evaluated with the ABES. Five samples for each conditioning method were evaluated.

The effect of crosslinking was also studied with xylan and PVAm. The tensile shear strengths of veneers bonded with dispersions containing combinations of xylan, PVAm and glyoxal are shown in FIG. 10. The addition of glyoxal gave rise to only a small increase in the dry bond strength for X20-G0.8-PVAm2.4 and X20-G4-PVAm2.4, and the tensile shear strengths after water treatment were reduced. In addition, the bonding performance drastically deteriorated when glyoxal was added to X20-PVAm5.6.

Figure 11:
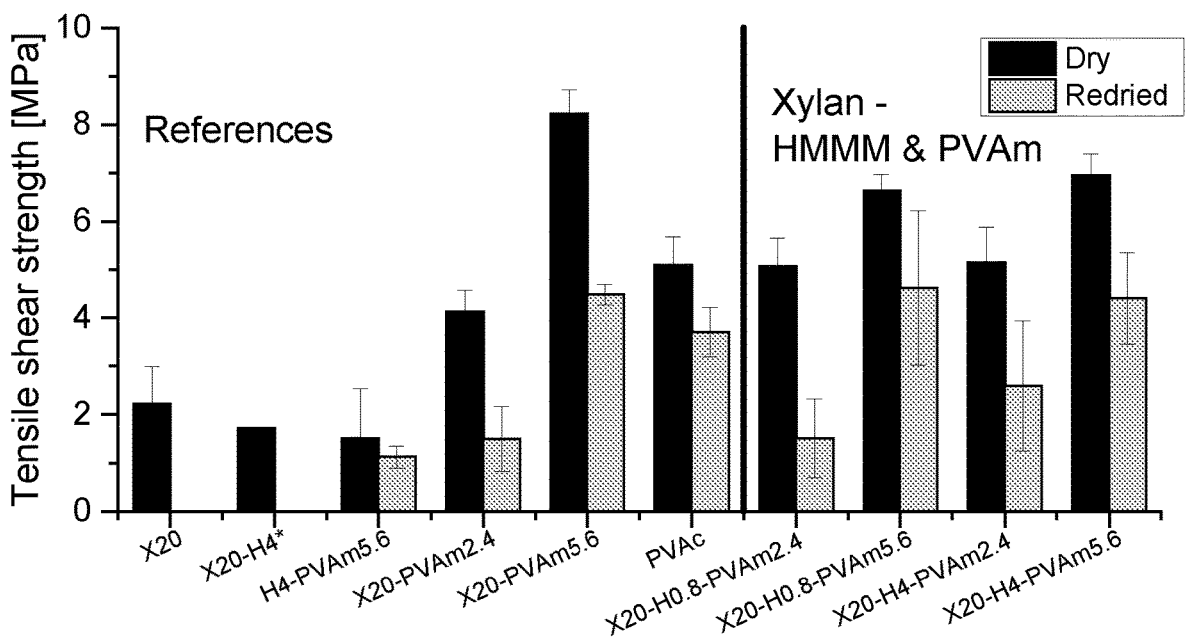
FIG. 11 the tensile shear strength of veneers bonded with xylan dispersed in HMMM and/or PVAm, pressed at 120° C. for 2.5 min and evaluated with the ABES. Five samples for each conditioning method were evaluated. *Only one sample was obtained in the press, the rest delaminated.

The addition of HMMM to an X-PVAm dispersion resulted in a heterogeneous dispersion with a very high viscosity that was even more difficult to apply to a wood surface than X-PVAm. The tensile shear strengths are shown in FIG. 11. X20-H0.8-PVAm2.4 showed a slight increase in the dry bond strength, on a par with PVAc, but the water resistance was not affected. With a further addition of HMMM, X20-4-PVAm2.4, the tensile shear strength of the redried samples also improved but it was still not as high as that of the PVAc bonded veneers. The addition of HMMM to a xylan dispersion with the higher amount of PVAm, 5.6 wt %, reduced the dry bond strength of the veneers but the water resistance was unchanged.

Figure 12:
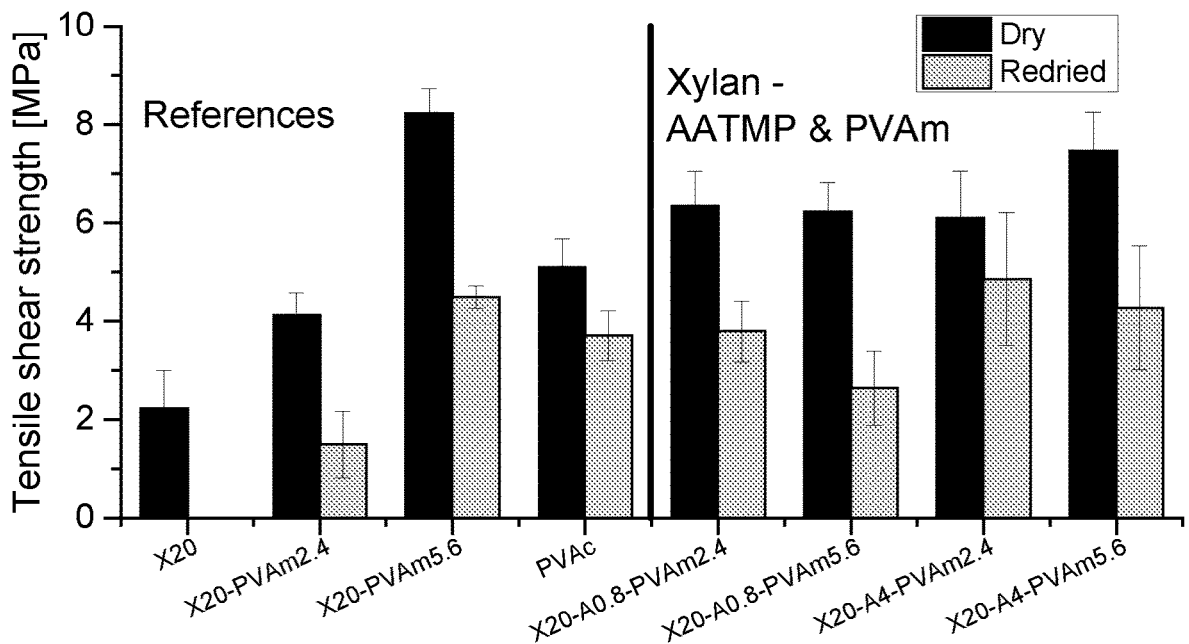
FIG. 12 the tensile shear strength of veneers bonded with xylan dispersed in AATMP and/or PVAm, pressed at 120° C. for 2.5 min and evaluated with the ABES. Five samples for each conditioning method were evaluated.

The xylan and PVAm dispersions were further modified with AATMP, an acetyl acetonate trimer that can react with amines. It has been used for modification of adhesives, for example in crosslinking wheat gluten in the preparation of adhesives for particleboards. When AATMP was added to the xylan dispersion with a low amount of PVAm, the dry bond strength considerably increased to ~6 MPa, higher than that of PVAc at 5.1 MPa, FIG. 12, and the water resistance was also improved; X20-A0.8-PVAm2.4 was on a par with PVAc, and X20-A4-PVAm2.4 was even better than PVAc. However, the addition of AATMP to the xylan dispersions containing the higher amounts of PVAm, X20-A0.8-PVAm5.6 and X20-A4-PVAm5.6 did not lead to any improvement in bonding performance.

Figure 13:
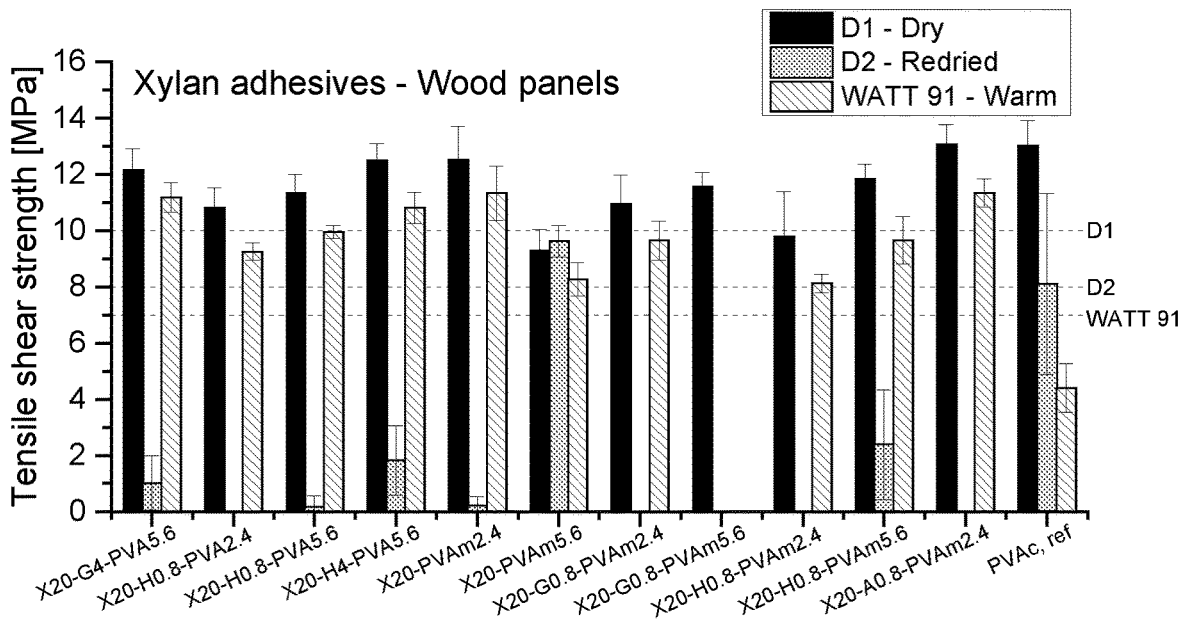
FIG. 13 tensile shear strength of wood panels bonded with different xylan-based wood adhesives and pressed at 120° C. for 10 min. The dotted lines show the limits to meet the D1, D2, and WATT 91 criteria. Ten samples for each conditioning method were evaluated. The wood specimens bonded with X20-G0.8-PVAm5.6 were not heat treated since too few specimens were obtained after the pressing due to delamination of the wood panel.

The xylan dispersions that showed the most promising bonding performance were further evaluated by bonding wood panels together according to European Standards EN 204 and EN14257. The tensile shear strengths of these bonded wood specimens are presented in FIG. 13. The horizontal lines show the different criteria that the adhesive needs to fulfill to be qualified as a D1, D2 or WATT 91 adhesive. Almost all the dry wood specimens fulfilled the D1 criterion of 10 MPa, except for X20-PVAm5.6 and X20-H0.8-PVAm2.4, which were just below the limit. X20-PVAm5.6 had a very high viscosity and was difficult to spread out homogeneously, and this was probably the reason for the lower tensile shear strength. When studied with ABES, X20-PVAm5.6 resulted in the best bonding performance, but when larger wood panels were bonded, the limitation of spreadability was clearly apparent. If the dry content was decreased, thereby decreasing the viscosity, the spreadability could be improved, but this was not desirable due to the already high water content of the dispersions. The wood specimens that were conditioned in water for 3 h and redried need a tensile shear strength of 8 MPa to be classified as a D2 adhesive according to European Standard. Many of the bonded wood specimens delaminated when immersed in water or had low tensile shear strengths indicating poor water resistance. Wood specimens bonded with X20-PVAm5.6, however, showed surprisingly high tensile shear strengths above that of PVAc and above 8 MPa, and fulfilled the D2 criterion, even though it was difficult to apply the adhesive. The water immersion may have improved the wettability of the adhesive and allowed better contact with the wood surface. The heat resistance of polysaccharides is often very good possibly due to their cyclic structure (glycosyl units) and the formation of hydrogen bonds. All the wood specimens bonded with the different xylan dispersions fulfilled the WATT 91 criterion of 7 MPa. PVAc is sensitive to elevated temperatures and is not classified as a WATT 91 adhesive.

To summarize, xylan can be used as the major component of a wood adhesive. In combination with dispersing agents and crosslinkers, xylan dispersions show a promising bonding performance but the spreadability must be improved to achieve a high bond strength when larger areas are bonded. Xylan dispersed in PVAm showed a remarkably good bonding performance, especially with the larger amount of PVAm, X20-PVAm5.6, even though the high viscosity made it difficult to apply the adhesive smoothly. The addition of a crosslinker, such as HMMM or AATMP, can improve the bonding performance with a low amount of PVAm, 2.4 wt % but the bonding performance deteriorated with a higher amount, 5.6 wt %. It seems that PVAm forms strong attractive interactions between xylan and the wood surface, and these interactions may be weakened and interrupted when a crosslinker is added. Another possibility is that premature curing of the adhesive may occur before the adhesive is applied to the wood. To avoid the effect of premature curing, two-component adhesives were prepared and evaluated, but the bonding performance was not improved (results not shown). In an attempt to study the reactions between xylan and the dispersing agent and/or crosslinker, films were prepared on glass substrates and dried at 120° C. for 10 min, and at room temperature overnight. The films were studied with FTIR, but it was difficult to draw any conclusions since different spectra were obtained in different regions of the film, probably because the dispersions did not react homogeneously and several characteristic bands overlapped each other.

In a comparison between gum and xylan dispersions, it can be stated that the results with xylan alone were similar to those of XaG and TG, but not as good as the LBG counterparts. However, the addition of a dispersing agent and crosslinker can considerably improve the bonding performance of xylan and make it superior to the gum dispersions. Due to the viscosity increase when additives were added to the gum dispersions, those were only evaluated alone.

Highlights:
  Xylan in combination with dispersing agents and crosslinkers can be used as a wood adhesive.
  Xylan dispersions can be classified as D1 and WATT 91 adhesives.
  Xylan dispersed in PVAm demonstrates very good results regarding water resistance as well as heat resistance.

Pulp-Process-Derived Hemicellulose Dispersions

Figure 14:
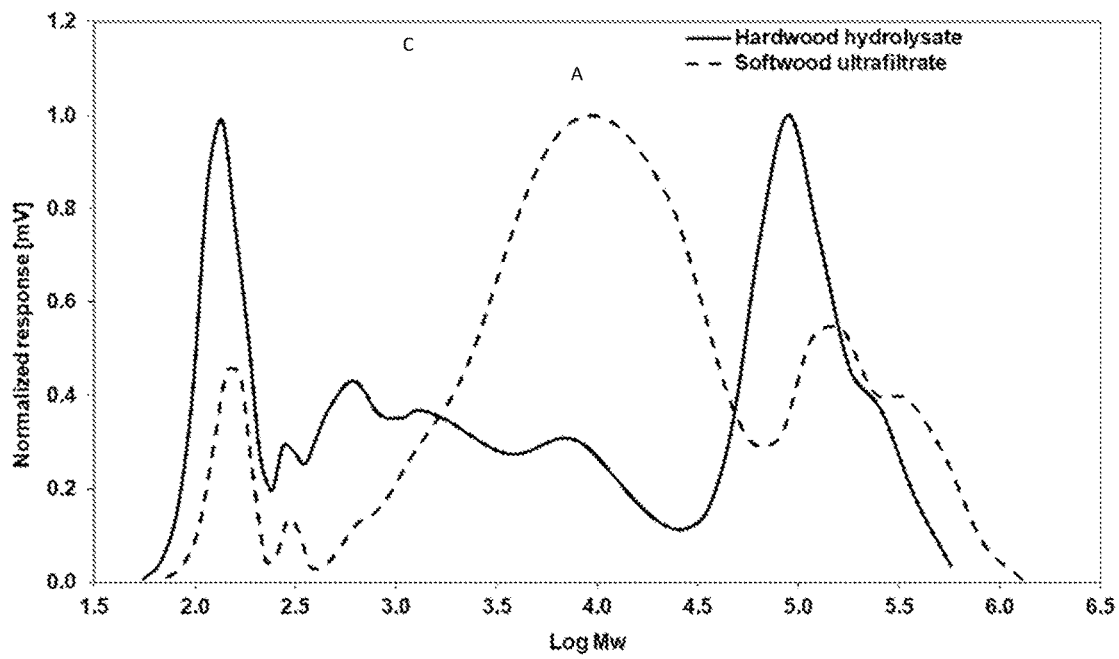
FIG. 14 SEC traces of molecular weight distributions of hemicellulose in the hardwood hydrolysate and in the softwood ultrafiltrate.

Hemicelluloses similar to the by-products from the pulp mills were finally obtained in the form of hemicellulose-rich liquids of hardwood hydrolysate and softwood ultrafiltrate. The hardwood hydrolysate was obtained from the prehydrolysis of wood chips, kindly supplied by Holmen in collaboration with MoRe Research, and the softwood ultrafiltrate was obtained from ultrafiltered process water from a thermomechanical (TMP) pulp mill using softwood, kindly supplied by Stora Enso, Kvarnsveden. The composition of the hemicellulose-rich liquids was studied by ion-exchange chromatography and, as expected, the hardwood hydrolysate contained mainly xylose and the softwood ultrafiltrate mainly mannose and glucose. Both samples also contained some lignin, 36 and 13 g kg$^{-1}$, respectively. The molecular weight distributions of the hardwood hydrolysate and of the softwood ultrafiltrate are shown in FIG. 14 and Table 7. Both samples contained several populations with both low and high molecular weight distributions. The major peak of hardwood hydrolysate was at ~86 000 g mol$^{-1}$ (peak A), whereas the major peak of the softwood hydrolysate was 3 900 g mol$^{-1}$ (peak C).

TABLE 7

Molecular weights of hemicelluloses in the hardwood hydrolysate and softwood ultrafiltrate.

|  | $M_n$ [g mol$^{-1}$]. | $M_W$ [g mol$^{-1}$]. | Đ |
|---|---|---|---|
| Hardwood hydrolysate | 400 | 31000 | 77 |
| Peak A | 86000 | 120000 | 1.4 |

TABLE 7-continued

Molecular weights of hemicelluloses in the hardwood hydrolysate and softwood ultrafiltrate.

|  | $M_n$ [g mol$^{-1}$]. | $M_W$ [g mol$^{-1}$]. | Đ |
|---|---|---|---|
| Softwood ultrafiltrate | 1200 | 42000 | 35 |
| Peak C | 3900 | 11000 | 2.8 |

Hereafter, all adhesives were evaluated by bonding wood veneers with a bond area of 4 cm$^2$ and the tensile shear strength was determined with an Instron. PVAc was still used as a reference benchmark. Xylan dispersions were also prepared for comparison with the dispersions used to bond wood veneers that were evaluated with the ABES technique and wood panels.

Figure 15:
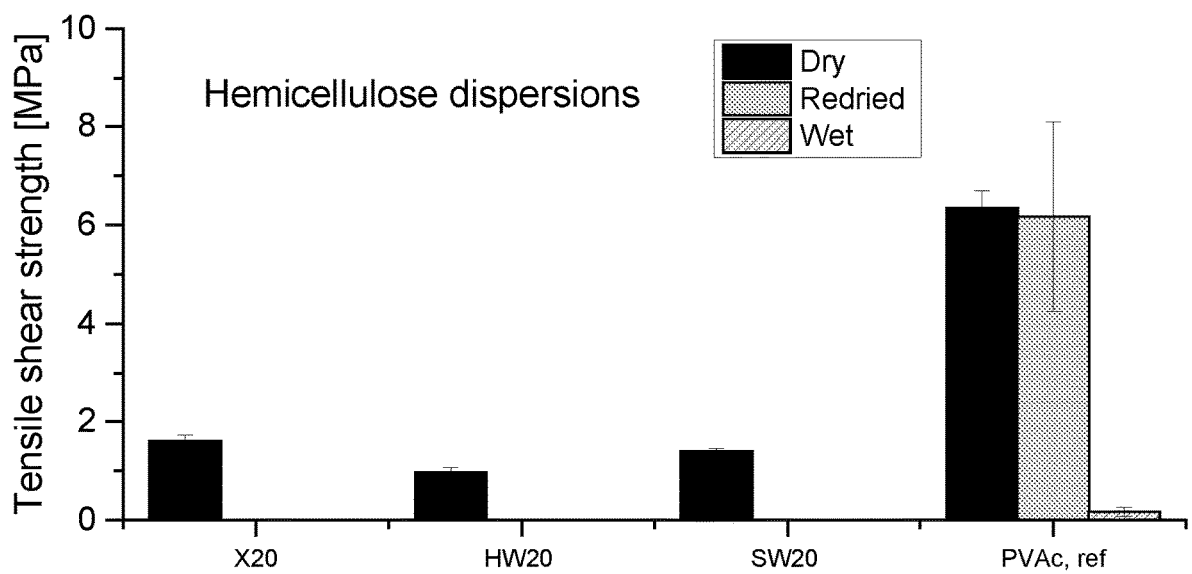
FIG. 15 tensile shear strength of wood veneers bonded with hemicellulose and PVAc reference, pressed at 120° C. for 2.5 min and evaluated with the Instron. Three samples for each conditioning method were evaluated.

Dispersions with 20 wt % dry content of the different hemicelluloses were prepared. The hemicellulose-rich liquids (HW20 and SW20) were diluted, and the xylan (X20) was dispersed in deionized water. The hemicellulose-rich liquids had a much lower viscosity than the xylan dispersion, probably because they were better dispersed and less aggregated than the xylan that had been dried. None of the veneers bonded with hemicellulose dispersion had sufficient bonding strength, as shown in FIG. 15. A higher dry content adhesive, up to 50 wt % was evaluated, but the bonding performance was not improved. The hemicelluloses alone were too brittle to give sufficient adhesion. The dispersions probably also over-penetrated into the wood, since very little material was visible on the wood surface after tensile testing.

Motivated by the promising results of using PVAm as a dispersing agent for xylan, the hemicellulose-rich liquids were diluted in PVAm solutions. Xylan was also dispersed in a PVAm solution for comparison. The hemicellulose dispersions all became very gel-like when PVAm was added, and it was then very difficult to spread the adhesive over the wood surface. Hemicellulose was dispersed in PVAm with three ratios: (15:5, 10:10 and 5:15 wt %). The greater the amount of PVAm the more gel-like was the adhesive.

Figure 16:
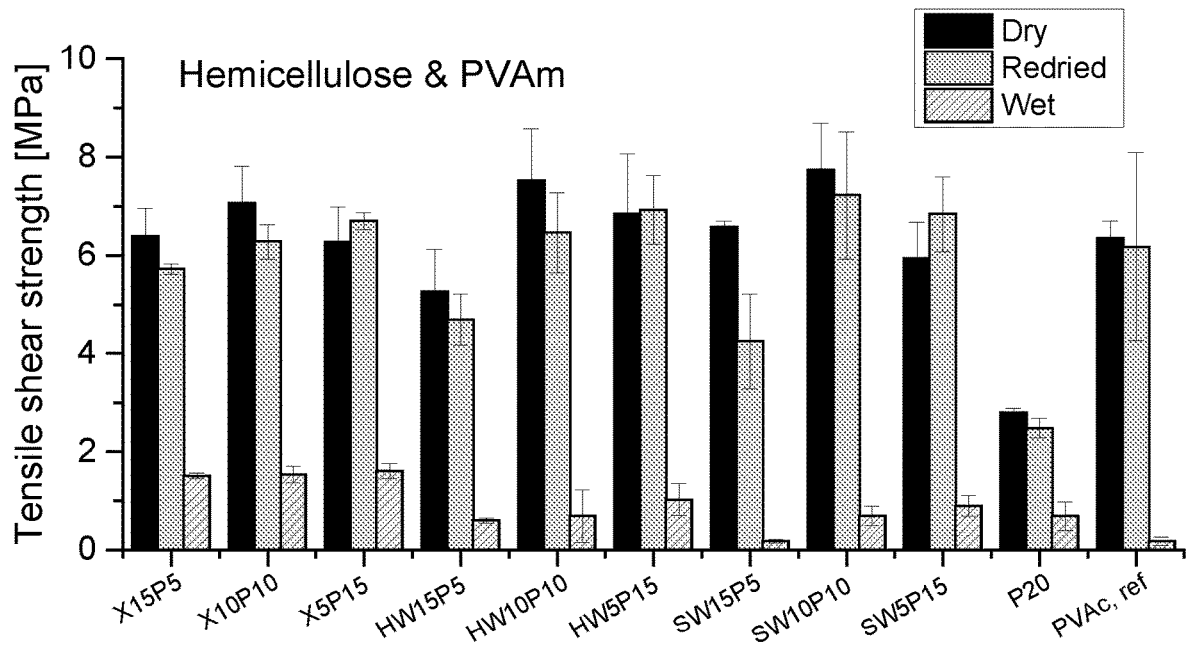
FIG. 16 tensile shear strength of wood veneers bonded with hemicellulose in combination with PVAm, PVAm, and PVAc reference, pressed at 120° C. for 2.5 min and evaluated with the Instron. Three samples for each conditioning method were evaluated.

Veneers were bonded with the different dispersions and the tensile shear strengths were evaluated after conditioning, as shown in FIG. 16. Veneers bonded with xylan dispersed in PVAm showed very promising results. The dry and redried samples showed tensile shear strengths on a par with those of PVAc. In addition, the wet samples showed high tensile shear strengths ~1.5 MPa superior to that of PVAc at 0.17 MPa. Furthermore, the amount of PVAm had no effect on the bonding performance; all the ratios exhibited very similar tensile shear strengths.

The hemicellulose-rich liquids in combination with PVAm also showed a very promising bonding performance. The bonding performances of hardwood hydrolysate and softwood ultrafiltrate were very similar. Veneers bonded with dispersions containing 10 wt % hemicellulose and 10 wt % PVAm had a dry bond strength greater than 7.5 MPa, which was superior to that of PVAc at 6.3 MPa and all the xylan dispersions. The veneers also showed very good water resistance. The tensile shear strengths of the redried samples were 6.5 (HW10P10) and 7.2 MPa (SW10P10), which were higher than that of PVAc at 6.2 MPa. Veneers bonded with dispersions of 10 wt % hemicellulose and 10 wt % PVAm, immersed in water for 4 days and tested in the wet state also displayed rather high tensile shear strengths, well above that of PVAc but lower than that of xylan with PVAm. When a greater amount of PVAm was used (5 wt % hemicellulose and 15 wt % PVAm) the tensile shear strength of the wet samples increased slightly but there was no significant improvement in the dry and redried samples. Veneers bonded with a dispersion having a greater proportion of hemicellulose (hemicellulose 15 wt % and 5 wt % PVAm) had a lower tensile shear strength than the other combinations. The hardwood hydrolysate (HW15P5) gave a slightly lower dry bond strength (5.3 MPa) than softwood ultrafiltrate (SW15P5) at 6.6 MPa. The tensile shear strengths of the redried samples were very similar, but not as high as that with PVAc. In FIG. 16, the tensile shear strengths of veneers bonded only with PVAm as a reference (P20) are also shown. Neither hemicellulose alone, FIG. 15, nor PVAm alone, FIG. 16, provided sufficient bonding strength. The combination of hemicellulose and PVAm was necessary to obtain an adhesive with sufficient properties. Again, it seems like PVAm forms strong attractive interactions with the hemicelluloses, and the wood substrate.

Inspired by the promising results of using PVAm in combination with hemicellulose, other amino-functional polymers were considered as an alternative to PVAm.

Figure 17:
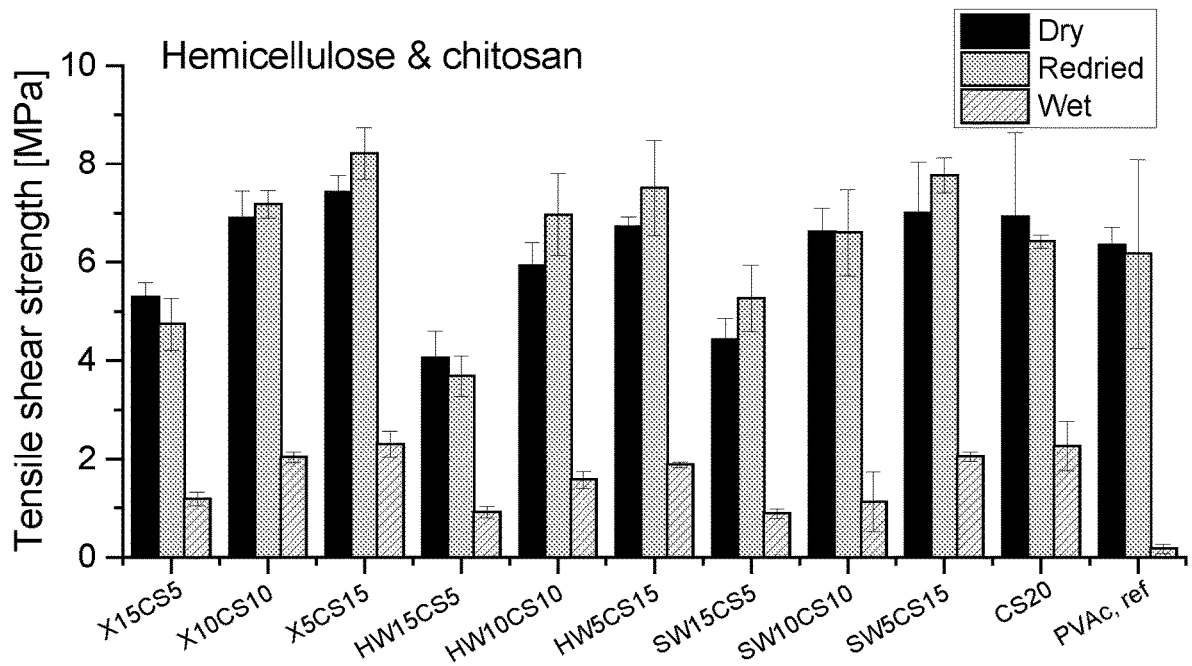
FIG. 17 tensile shear strength of wood veneers bonded with hemicellulose in combination with chitosan, chitosan, and PVAc reference, pressed at 120° C. for 2.5 min and evaluated with the Instron. Three samples for each conditioning method were evaluated.

Chitosan was first evaluated alone as a reference, dispersed in an acetic acid solution (aq), at pH 2, to protonate the amine groups and achieve good dispersity of the chitosan. The dispersion had a dry content of 20 wt %, and a rather high viscosity, but it was easy to apply to the wood surface. The bonding performance of veneers bonded with chitosan, CS20, is shown in FIG. 17. The tensile shear strength of the dry and redried samples bonded with chitosan were on a par with that of PVAc. Chitosan also gave a remarkable water resistance, with very high tensile shear strength of the wet samples. The chitosan that was used had a degree of deacetylation of 77% which means that there are N-acetyl groups on approximately every fourth unit on average. The acetyl groups can possibly contribute to hydrophobicity, improving the water resistance of the adhesive. However, the effect of acetyl groups on the adhesive was not evaluated in this study.

Xylan, hardwood hydrolysate and softwood ultrafiltrate were investigated in combination with chitosan in the ratios of 15:5, 10:10, and 5:15 wt %. Xylan dispersed with chitosan had a very high viscosity, and the dispersions were difficult to spread over the wood surface. Compared with PVAm dispersions that were very gel-like, chitosan dispersions had a lower viscosity and were easier to apply onto wood. The hemicellulose-rich liquids in combination with chitosan had lower viscosities than xylan with chitosan and were easier to apply onto wood. More hemicellulose in the dispersion resulted in a lower viscosity and better applicability onto wood. The bonding performance of veneers bonded with hemicellulose-chitosan adhesives is shown in FIG. 17. With a large proportion of hemicellulose (15 wt %) the tensile shear strength of neither the dry nor the redried samples was as good as that of the PVAc reference, but the tensile shear strength of the wet samples was superior to that of the PVAc reference. The bonding performance was further improved with the addition of more chitosan. The water resistance was remarkably good for the hemicellulose-chitosan adhesives, which has a tensile shear strength of the wet samples much higher than that of PVAc. The bonding performance of hemicellulose with chitosan (5:15) was better than that of chitosan alone.

It was observed that several veneers obtained a higher bond strength after water treatment and redrying. This could be due to that the adhesive did not wet the wood substrate sufficiently due to the high viscosity, and later, when the samples are immersed in water, the wettability is improved. Another reason could be that acetic acid is leaching out, resulting in a higher pH in the bond line. Chitosan precipitates at neutral pH and becomes insoluble in water. This can explain the higher tensile shear strengths after water treatment.

The commercial xylan from beech-wood showed better bonding than the hemicellulose-rich liquids in all compositions, but xylan in combination with chitosan had a higher viscosity than the hemicellulose-rich liquids and was more difficult to spread out on larger areas.

The hardwood hydrolysate and softwood ultrafiltrate had a very similar appearance and bonding performance, even though they differed from each other in both structure and molecular weight. The extraction and workup procedures differed between the samples but it did not seem to affect the bonding performance. Hardwood hydrolysate gave a slightly lower bonding strength when the hemicellulose was the major part of the adhesive; otherwise, the bonding performances were similar. These results indicated that the type of hemicellulose (xylan or glucomannan) and the procedure to collect the hemicellulose had no decisive effect on the bonding performance. It also indicated that it was not crucial to have a pure or well-defined hemicellulose to obtain an adhesive which gave sufficient bonding strength. This is beneficial since the hemicellulose can be obtained from different sources, increasing the availability, and it allows an easier and cheaper procedure to produce adhesives.

Figure 18:
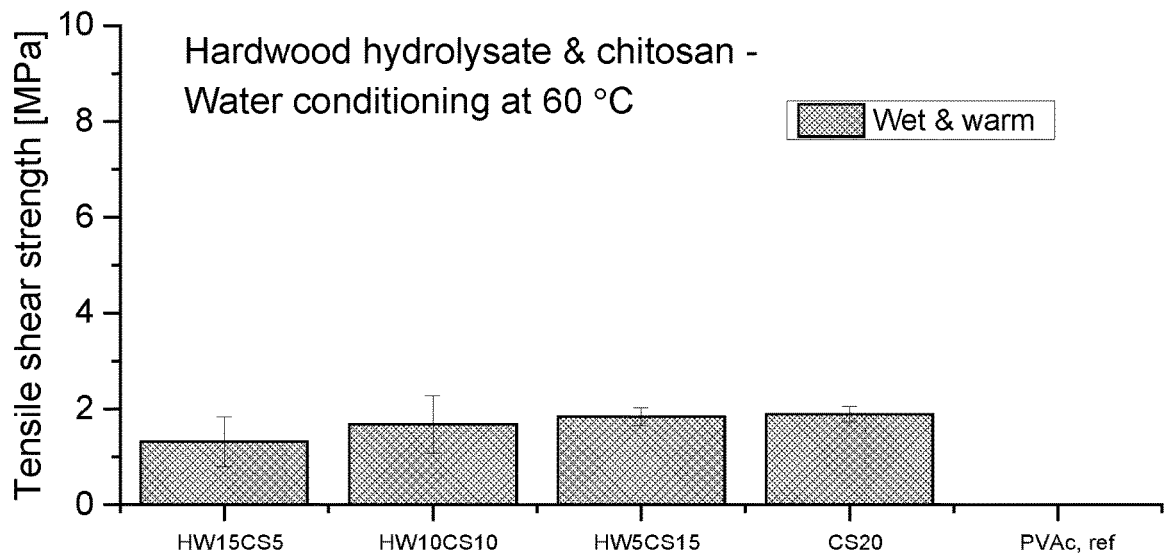
FIG. 18 tensile shear strengths of wood veneers bonded with hardwood hydrolysate in combination with chitosan, pressed at 120° C. for 2.5 min, and after immersion in water at 60° C. for 3 h, evaluated with the Instron without drying. Three samples for each conditioning method were evaluated.

Inspired by the outstanding water resistance the veneers bonded with the hardwood hydrolysate and chitosan dispersions were immersed in water at 60° C. for 3 h and thereafter, the tensile shear strength was directly measured. The results are shown in FIG. 18, with veneers bonded with PVAc and chitosan alone as references. Veneers bonded with PVAc delaminated in water, whereas the others showed a strong water resistance and held together. The tensile shear strengths of the different dispersions were very similar.

Figure 19:
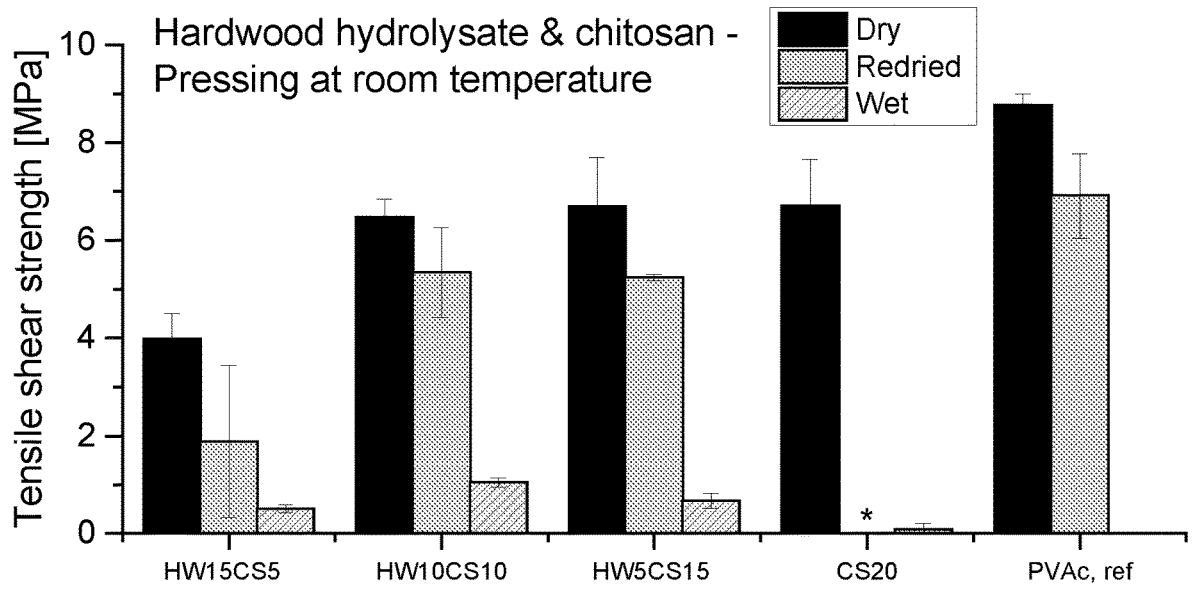
FIG. 19 tensile shear strengths of wood veneers bonded with hardwood hydrolysate in combination with chitosan, chitosan and PVAc reference, pressed at room temperature for 2 h and evaluated with the Instron. Three samples for each conditioning method were evaluated. *Veneers bonded with chitosan immersed in water started to delaminate during drying.

As mentioned earlier, PVAc adhesives are sensitive to elevated temperatures and are normally pressed at room temperature and not at 120° C. which was used here. Pressing at room temperature was therefore evaluated on veneers bonded with HW:CS dispersions. The results are presented in FIG. 19. Even though the dry content is relatively low, 20 wt % (80 wt % water), it was possible to press the samples at room temperature. The tensile shear strength of the dry samples was not as high as that of PVAc, but it was still good considering the large amount of water in the dispersions. Veneers bonded only with chitosan started to delaminate during drying after water immersion whereas the hemicellulose-containing adhesives held together, and the tensile shear strength of the wet hemicellulose-chitosan samples was superior to that of both chitosan alone and PVAc.

Figure 20:
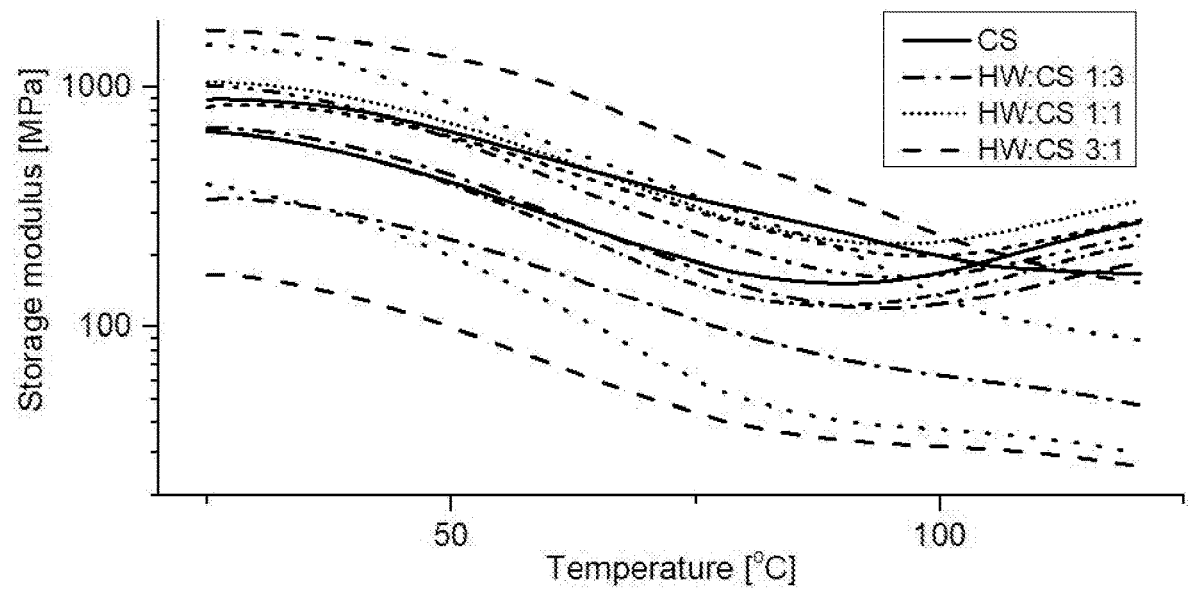
FIG. 20 storage modulus versus temperature of chitosan and hardwood hydrolysate-chitosan films. Samples are evaluated in triplicates.
Figure 21:
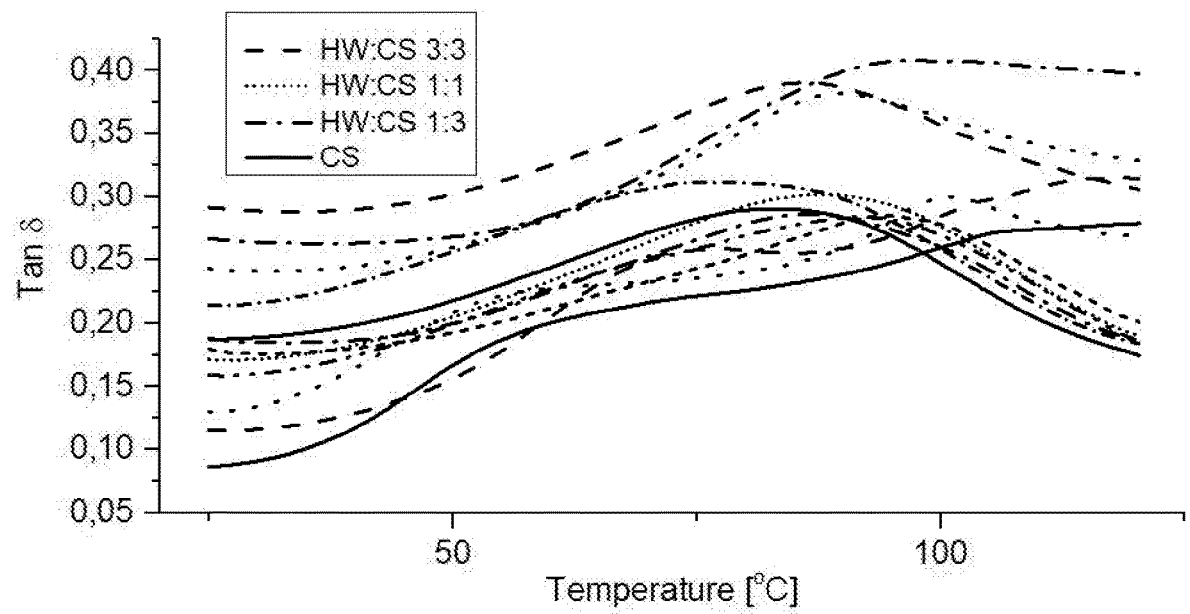
FIG. 21 Tan δ versus temperature of chitosan and hemicellulose-chitosan films. Samples are evaluated in triplicates.

In an attempt to gain a better understanding of how the hemicellulose-chitosan adhesives work, the hardwood hydrolysate in combination with chitosan was further studied. Solvent-cast films of the dispersions were prepared in Petri dishes, and the mechanical properties were studied with dynamic mechanical analysis, DMA. Films of chitosan alone and of hardwood hydrolysate alone were also prepared as references, but hardwood hydrolysate did not form a self-supporting film. DMA was used to measure the storage modulus, FIG. 20, and tan δ, FIG. 21, of the films. The experiment was run from 25-130° C., which is within the temperature range where the adhesive was pressed during the bonding of the veneers. The storage modulus decreased slightly when hemicellulose was combined with chitosan. The films of HW:CS (1:3 and 1:1) followed each other and showed a transition below 100° C. after which the storage modulus increased. The films containing only chitosan did not show the same transition, but the slope decreased above 100° C. indicating that some transition occurred in the material. Films containing more hemicellulose (films with HW:CS, 3:1) showed a significantly lower storage modulus than the other films with a broader transition. Chitosan showed more than one transition in tan δ indicating a heterogeneous material. The incorporation of hemicellulose resulted in a more uniform but broader transition. The transitions for films of HW:CS 1:3 and HW:CS 1:1 were below 100° C. and films of HW:CS showed a slightly lower transition. Tan δ was higher for films of HW:CS 3:1 but the transition was within the same temperature region.

The films were also studied with FTIR in an attempt to elucidate possible chemical interactions between the hemicellulose and chitosan. FTIR spectra were obtained prior to and after heat treatment of the films in the DMA. Initially, indications of chemical reactions between hemicellulose and chitosan were observed with new peaks and changes in the spectra after heat treatment. However, after further study of the films that had been heat-treated for longer times, and water treated, it was concluded that the changes were due to the acetic acid that protonated chitosan and gave rise to changes in the FTIR spectra. After longer heat and water treatments, the spectra slowly changed and only the peaks characteristic of hemicellulose and chitosan were observed.

Figure 22:
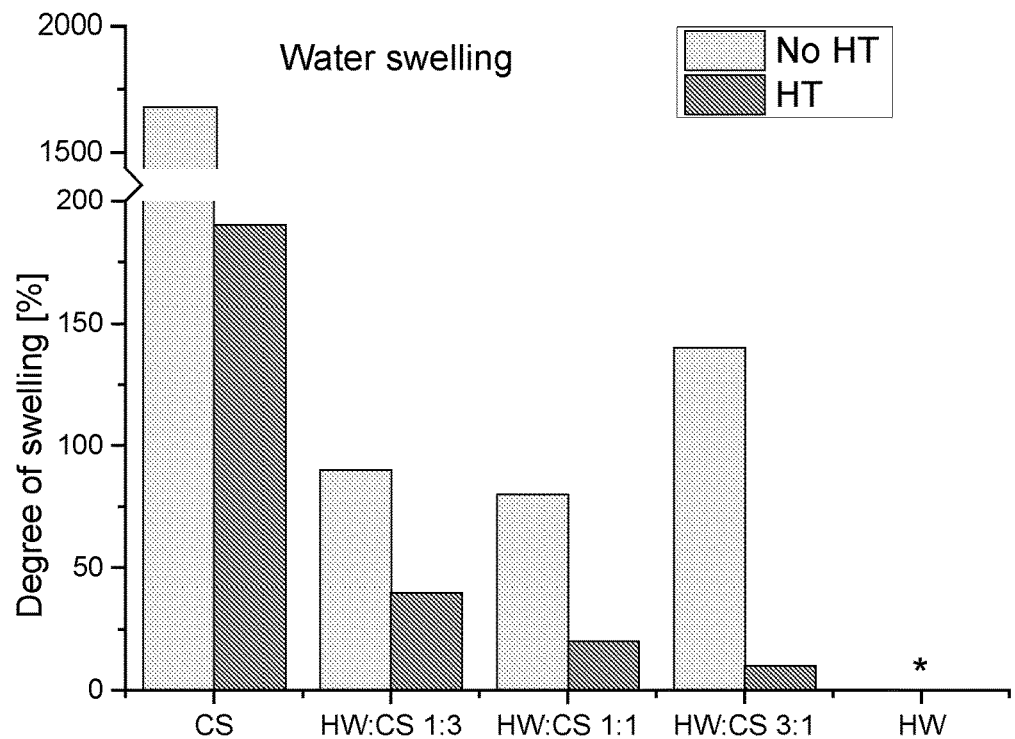
FIG. 22 swelling in water of films prepared of chitosan, hardwood hydrolysate-chitosan, and hardwood hydrolysate, with and without treatment in DMA.

Even though no chemical reactions were observed by the FTIR analysis, interesting features were observed when the films were immersed in water. Films, with and without heat-treatment in the DMA, were immersed in water for 1 h. The swelling in water of the films was measured gravimetrically and the results are shown in FIG. 22. Chitosan films, both with and without heat treatment, swelled considerably in water and started to disintegrate. Pieces of the hemicellulose film dissolved when the film was immersed in water. In contrast, the hemicellulose-chitosan films stayed intact and did not swell as much as the chitosan alone. The heat-treated samples swelled even less than the others, indicating the presence of strong interactions between hemicellulose and chitosan. These results were however obtained for only one film of each type, so no far-reaching conclusions can be drawn.

Highlights:
Hemicelluloses derived from pulp processes in combination with PVAm can be used as binders in wood adhesives.
A fully bio-based adhesive composed of hemicellulose and chitosan shows a remarkably good bonding performance especially regarding water resistance, which is superior to that of a commercial PVAc-adhesive.
Commercial xylan gives somewhat greater bonding strength than the hemicellulose-rich liquids, but the high viscosity of xylan is a drawback if larger areas are to be bonded.
The appearance and bonding performance of hardwood hydrolysate and softwood ultrafiltrate are very similar. The type of hemicellulose or the extraction process does not seem to have a critical effect on the characteristics of the adhesives.

Particle Boards

Saw dust particles (50 g) from pine with 35-45% water content were blended with 18% of adhesives (based on particles weight) in a blender for 5 min. The mixture was left in the oven at 50° C. for drying down to 30% water content before hot-pressing. The dried particles were added into a 9×7 cm² mold with 6 cm height to form a mat. The mat was pressed in the piston area (the area of each piston is 225 cm2) of the Carver press under 6 metric tons and 150-200° C. for 15 min. The boards were cut into 5×5 cm² specimens for testing. Three samples for each composition were prepared.

LB gum was used as received (powder form). Hydrolysates and PVAm was used without applying any further dispersion preparation.

The prepared specimens were evaluated according to European Standard EN3192. All specimens were glued between 5×5 cm2 metal blocks by epoxy glue and then conditioned for at least 24 h prior to testing in a conditioning room with 20° C. and 62% relative humidity.

The strength of the samples was measured by a universal testing machine, Alwetron. Internal bonding (IB) was calculated as force at break divided by test area (N/m2).

Example 2

Materials

Locust bean gum (LBG) from *Ceratonia siliqua* seeds, chitosan (CS), low molecular weight, (product number: 448869) with a viscosity of 92 mPas and degree of deacetylation of 77% were purchased from Sigma Aldrich. Hardwood hydrolysate (HW) and sawdust particles were kindly supplied by Holmen. Lupamin® 9095, 20 wt % solution of poly(vinyl amine) (PVAm, P) with a molar mass of 340 kg mol$^{-1}$ was supplied by BASF.

UF (urea formaldehyde) resin was kindly provided by AkzoNobel, Årsta. Wood particles (mainly from spruce) were provided by Holmen, Iggesund.

TABLE 8

Molar masses of the materials as adhesive components

| Adhesive | Molar mass [kg/mol] |
| --- | --- |
| LBG | 1000 |
| HW | No information |
| Chitosan | 50-190 |
| PVAm | 340 |

Reference particleboards were commercially available by ByggElit (19 mm thick), Bauhaus (~12 mm thick) and the rest were either provided by AkzoNobel (~15 and 16 mm thick) or prepared in the lab by UF resin (~10 mm thick).

Preparation of Particleboards (PB)

Particleboards were produced from, pinewood (softwood). One layer laboratory particleboards were made by sawdust particles with board density range between 473 and 819 kg/m³, and as adhesive HW-PVAm, HW-CS, LB gum, LB gum-HW, LB-gum-HW-CS and UF were used. Among all the samples prepared the particleboards with an adhesive content of 18% (based on wood particle amount), prepared using 6 metric ton press and a press temperature between 150 and 200° C. (depending on the adhesive system used) were evaluated for their performances as those were the better boards. Internal bonding (IB), thickness swelling (TS) and water absorption (ABS) of the specimens were tested according to EN standards (SS-EN-317, SS-EN-319).

In each experiment, 50 g of dry wood particles were employed to prepare particleboard. Water content of the particles was measured at each step. Controlled drying of the adhesive blended particles was achieved by continuous moisture analyses during the oven drying at ~50° C. Three samples of each composition were prepared for tests.

For each sample, wood particles with a certain percent dry content (35-40% water content) were used.

The % water content was determined from measurements with an IR moisture balance. From this the amount of particles needed was calculated based on 50 g of dry particles.

Wood particles were dried to (or water sprayed, if required) 30% water content (±2%) in oven at 50° C., just before pressing.

For each formulation 18% (wt) of adhesive (dry amount of e.g. hydroylysate, chitosan and acid) based on dry amount of sawdust particles (50 g) was used.

Blended mixture (wood particle and adhesive) was put into a premade mold (9×7 cm) standing on a metal plate with non-stick paper in between and gently packed with a spoon.

The mold was carefully removed. A second metal plate with non-stick paper were then put on top of this packed sawdust particles stack, two metal bars were put parallel to each other on each side of the sawdust particles.

Thereafter the plates with sawdust particles mixture in between were put into the pre heated (150, 185 or 200° C.) carver press After pressing, the particleboard was swiftly separated from the metal plates and left to cool.

5×5 cm specimens were cut from the middle of each particleboard. Samples (5×5 cm) were glued between metal blocks specially designed for Alwetron testing by Tecbond polyamide hot-melt glue and the samples left under press in conditioning room. The specimens were conditioned according to standard (SS-EN-319).

Particleboards with HW-PVAm Adhesive System

Hydrolysate (2.25-6.75 g dry weight) was added to wood particles with a water content of 35-40% where after it was blended for 5 min in a kitchen blender. After that PVAm (2.25-6.75 g dry weight) was added to the mixture and blended for an additional 5 min. The mixture was left to dry down to 30±2% water content, in the oven at 50° C. In case of urea added samples, after finishing 5 min blending in hydrolysate addition step, urea (0.9 g in 10 mL water) was sprayed onto particles and the mixture is blended for 5 min. The mixture is then dried to 30±2% water content in the oven at 50° C.

Particleboards with HW:CS Adhesive System

Method 1 (Mt1): Chitosan as powder (2.25-6.75 g) was added to wood particles (50 g dry weight) with a water content of 35-40% forming a mixture and then acetic acid (10 mL) was sprayed (~20 spray) on the obtained mixture and then blended in the kitchen blender for 5 min. Hydrolysate (2.25-6.75 g dry weight) was added afterwards and then the mixture was blended for additional 5 min. The mixture is then dried down to 30±2% water content in the oven at 50° C. In case of urea added samples, after finishing 5 min blending in hydrolysate addition step, urea (0.9 g in 10 mL water) was sprayed onto particles and the mixture is blended for 5 min. The mixture is then dried to 30±2% water content in the oven at 50° C. Method 2 (Mt2): Hydrolysate (2.25-6.75 g dry weight) was the first adhesive component added to blend with wood particles with a water content of 35-40% (50 g dry weight). After blending hydrolysate with wood particles for 5 min, chitosan as powder (2.25-6.75 g) was added and then acetic acid (10 mL) was sprayed (~20 spray) followed by 5 min blending. The mixture is then dried to 30±2% water content in the oven at 50° C.

Particleboards with LB Gum

Locust bean gum as powder (9 g) was added to the wood particles with 35-40% (50 g dry weight, particle size 2-10 mm) water content and then 10 mL of water was sprayed (~20 spray) on the mixture and then blended in the kitchen blender for 5 min. The mixture was then dried to 30±2% water content in the oven at 50° C. In case of urea added samples, after finishing 5 min blending in LB gum addition step, urea (0.9 g in 10 mL water) was sprayed onto particles and the mixture is blended for 5 min. The mixture is then dried to 30±2% water content in the oven at 50° C.

Particleboards with LB Gum:HW Adhesive System

LB gum as powder (4.5 g) was added to wood particles (50 g dry weight, particle size 2-10 mm) with a water content of 35-40% forming a mixture and then water (10 mL) was sprayed (~20 spray) on the obtained mixture and then blended in the kitchen blender for 5 min. Hydrolysate (4.5 g dry weight) was added afterwards and then the mixture was blended for additional 5 min. The mixture is then dried down to 30±2% water content in the oven at 50° C.

Particleboards with LB Gum:HW:CS Adhesive System

CS as powder (3 g) was added to wood particles (50 g dry weight, particle size 2-10 mm) with a water content of 35-40% forming a mixture and then acetic acid (10 mL) was sprayed (~20 spray) on the obtained mixture and then blended in the kitchen blender for 5 min. Secondly, LB gum as powder (3 g) was added to CS and wood particle blend followed by water (10 mL) spray (~20 spray) on the mixture. After mixing the mixture for 5 min, hydrolysate (3 g dry weight) was added and then the mixture was blended for additional 5 min. The mixture is then dried down to 30±2% water content in the oven at 50° C.

Particleboards with LB Gum:CS Adhesive System

CS as powder (4.5 g) was added to wood particles (50 g dry weight, particle size 2-10 mm) with a water content of 35-40% forming a mixture and then acetic acid (10 mL) was sprayed (~20 spray) on the mixture and then blended in the kitchen blender for 5 min. Secondly, LB gum as powder (4.5 g) was added to CS and wood particle blend followed by water (10 mL) spray (~20 spray) on the mixture. The mixture is then dried down to 30±2% water content in the oven at 50° C.

Particleboards with CS

CS (Chitosan) as powder (9 g) was added to wood particles (50 g dry weight, particle size 2-10 mm) with a water content of either 2-10% or 35-40% forming a mixture and then either water or acetic acid (10 mL) was sprayed (~20 spray) on the mixture and then in the kitchen blender for 5 min. The mixture is then dried down to 30±2% water content in the oven at 50° C.

Results and Discussion

Adhesion is believed to be influenced by the characteristics of the wood and adhesive, surface properties, interactions between adhesive (polymers) and substrate (wood), as well as bonding conditions.

In commercial particleboard preparation, the substrate (wood particle) is blended with the aqueous adhesive dispersions (usually by spraying), and then the particle-adhesive blend is formed into a mattress. The mattress is then finally pressed under a certain T and P to compact the particles together and cure the resin. Usually the water content of the starting particles is around 2%, and the water content of the particles blended with adhesive should be between 12-16% to avoid board delamination and steam explosion during pressing.

TABLE 9

Adhesion strength of HW/PVAm adhesive system with 1:3, 1:1, 3:1 weight ratio and urea added 3:1 (urea:HW-PVAm), pressed under 200, 185 and 150° C., together with reference materials, measured as internal bond of particleboards.

| Sample HW:PVAm* (weight) | Press T (° C.) | Thickness (mm) | Density (kg/m³) | IB (MPa) |
|---|---|---|---|---|
| 1:3 | 185 | 9.4 | 583 | 0.4 |
| 1:1 | 185 | 9.4 | 563 | 0.39 |
| 3:1 | 185 | 9.7 | 473 | 0.22 |
| 3:1 | 150 | 9.9 | 585 | 0.47 |
| 1:1 | 150 | 9.8 | 532 | 0.6 |
| 1:3 | 150 | 9.8 | 672 | 0 |
| 3:1 + 10% urea | 185 | 9.9 | 614 | 0.33 |
| UF1 | 185 | 9.68 | 800 | 0.12 |
| UF2 | 200 | 9.71 | 819 | 0.31 |
| ByggElit | — | 19 | 637 | 0.56 |
| Bauhaus | — | 12.2 | 578 | 0.41 |
| Standard1 | — | 15.0 | 635 | 0.55 |
| Standard2 | — | 16.2 | 611 | 0.38 |

*Ratio based on dry weight ratio

TABLE 10

Effect of press temperature, method of preparation and effect of adding urea:Adhesion strength of HW/CS adhesive system with 1:3, 1:1, 3:1, 1:10 and 10:1 weight ratio pressed under 185° C. and 150° C., prepared by either Method 1 or 2, measured as internal bond of particleboards.

| Sample HW:CS (weight) | Press T (° C.) | Thickness (mm) | Density (kg/m³) | IB (MPa) |
|---|---|---|---|---|
| 1:3 Mt1 | 185 | 9.6 | 620 | 0.41 |
| 1:1 Mt1 | 185 | 9.3 | 601 | 0.32 |
| 3:1 Mt1 | 185 | 9.7 | 575 | 0.76 |
| 1:10 Mt1 | 185 | 10 | 653 | 0.1 |
| 10:1 Mt1 | 185 | 9.9 | 660 | 0.08 |
| 1:3 Mt1 | 150 | 9.7 | 672 | 0.7 |
| 1:1 Mt1 | 150 | 10.1 | 517 | 0.1 |
| 3:1 Mt1 | 150 | 9.7 | 652 | 0.55 |
| 3:1 + 10% urea Mt1 | 185 | 10.0 | 672 | 0.53 |
| 3:1 + 10% urea Mt1 | 150 | 10.0 | 639 | 0.13 |
| 1:3 Mt2 | 185 | 10.0 | 476 | 0.33 |
| 1:1 Mt2 | 185 | 10.1 | 550 | 0.15 |
| 3:1 Mt 2 | 185 | 9.8 | 677 | 0.09 |

TABLE 11

Effect of press temperature, particle size, adhesive amount, effect of additive/co-adhesive:Adhesion strength of LB gum alone, with urea, or with HW, CS or HW and CS, pressed under 150, 185 and 200° C., with 7.5, 18 and 36% adhesive amount, measured as internal bond of particleboards.

| Sample LB gum | Press T (° C.) | Thickness (mm) | Density (kg/m³) | IB (MPa) |
|---|---|---|---|---|
| Mixed size particles* | 150 | 9.4 | 801 | 1.015 |
| Mixed size particles* | 185 | 9.5 | 699 | 0.945 |
| Mixed size particles* | 200 | 9.7 | 702 | 0.615 |
| Coarse particles* | 185 | 9.9 | 646 | 0.96 |
| Fine particles* | 185 | 9.9 | 614 | 0 |
| Mixed size particles, 7.5% adhesive | 185 | 10.1 | 684 | 0.52 |
| Mixed size particles, 36% adhesive | 185 | 10.1 | 684 | 0.52 |
| Fine particles, 36% adhesive | 185 | 9.7 | 734 | 0.23 |
| LB gum, 10% urea* | 185 | 9.9 | 646 | 0.66 |
| LB gum:HW:CS/1:1:1* | 185 | 9.7 | 619 | 0.32 |
| LB gum:HW/1:1* | 185 | 9.9 | 688 | 0.475 |
| LB gum:CS/1:1* | 185 | 9.5 | 593 | 0 |

*Adhesive amount is 18 wt %
**Mixed size particles = 2-10 mm, Coarse particles = 4-10 mm, Fine particles = 2-4 mm Locust bean gum prepared particleboards with coarse particles (4-10 mm) has shown similar internal bonding with that of mixed size particles (2-10 mm). With fine particles, particles formed a board after press but internal bonding was below 0.05 which was under the detection limit of the instrument (Alwetron). Small sized particles have more aspect ratio, thus they may require more adhesive for sufficient bonding. With this theory, the adhesive amount for fine particles were doubled in amount (36%), in another particleboard preparation attempt. Internal bonding result showed that increasing the amount of adhesive helped particleboard to get stronger but when compared to the ones prepared with bigger particles, it was still weak.

TABLE 12

Adhesion strength of chitosan measured as internal bond of particleboards. The effect of adhesive preparation and water content of starting wood particles.

| Sample Chitosan | Press T (° C.) | Thickness (mm) | Density (kg/m³) | IB (MPa) |
|---|---|---|---|---|
| Water spray | 185 | 9.5 | 742 | 0.22 |
| Acetic acid spray | 185 | 9.6 | 708 | 0.11 |
| Dry particles, acetic acid spray | 185 | 9.5 | 694 | 0.28 |

Thickness Swelling (TS) and Water Absorption (ABS)

Hemicelluloses contain hydrophilic groups (OH) and are thereby hygroscopic which result in a poor water resistance which in turn may limit adhesive properties during and after water uptake and.

The thickness swelling and water absorption tests were carried out to evaluate bonding performance.

Test pieces are immersed in water vertically at a temperature of 20° C. The data were recorded after 2 h, 24 h, 48 h and 72 h. Samples denoted Standard 1 and 2 are commercially available particle boards. These particles boards have a higher thickness than the lab prepared samples.

TABLE 13

ABS of reference materials and HW/PVAm, HW/CS and LB gum

| | ABS (%) | | | |
|---|---|---|---|---|
| Sample | 2 h | 24 h | 48 h | 72 h |
| UF 1 | 79.9 | 97.2 | 99.5 | 97.4 |
| Bauhaus | 74.4 | 110.6 | 117.9 | 118.9 |
| Standard 1 | 30.5 | 72.2 | 85.1 | 87.4 |
| Standard 2 | 13.2 | 52.4 | 77.7 | 85.5 |
| HW/PVAm/1:3 | 31.3 | 66.8 | 73.9 | 79.5 |
| HW/PVAm/1:1 | 85.6 | 96.1 | 101.7 | 103.9 |
| HW/PVAm/3:1 | 83.4 | 93.8 | 99.6 | 100.9 |
| PVAm | 136.2 | 144.8 | 150.0 | 143.8 |

TABLE 13-continued

ABS of reference materials and HW/PVAm, HW/CS and LB gum

| | ABS (%) | | | |
|---|---|---|---|---|
| Sample | 2 h | 24 h | 48 h | 72 h |
| HW:CS/1:3 | 128.3 | 146.6 | 145.5 | 147.4 |
| HW:CS/1:1 | 139.9 | 153.6 | 144.9 | 145.3 |
| HW:CS/3:1 | 126.9 | 139.5 | 135.2 | 139.9 |
| HW:CS/3:1, 150° C. | 108.9 | 128.1 | 124.9 | 124.5 |
| LB gum, 150° C. | 47.0 | 75.1 | 86.6 | 92.5 |
| LB gum, 185° C. | 51.8 | 94.9 | 117.8 | 122.3 |
| LB gum, coarse particles, 185° C. | 29.4 | 69.2 | 86.7 | 96.3 |

TABLE 15

TS of reference materials and HW/PVAm, HW/CS and LB gum

| | TS (%) | | | |
|---|---|---|---|---|
| Sample | 2 h | 24 h | 8 h | 72 h |
| UF 1 | 38.9 | 44.9 | 47.7 | 51.8 |
| Bauhaus | 21.9 | 24.7 | 24.3 | 25.5 |
| Standard 1 | 11.3 | 17.6 | 18.6 | 19.4 |
| Standard 2 | 8.5 | 23.8 | 32.4 | 33.1 |
| HW:PVAm/1:3 | 9.8 | 16.9 | 16.2 | 17.3 |
| HW:PVAm/1:1 | 19.6 | 23.1 | 21.9 | 20.1 |
| HW:PVAm/3:1 | 18.4 | 21.4 | 22.2 | 20.0 |
| PVAm | 52.8 | 72.9 | 68.6 | 91.3 |
| HW:CS/1:3 | 72.9 | 78.8 | 81.9 | 84.4 |
| HW:CS/1:1 | 41.6 | 58.4 | 70.2 | 77.0 |
| HW:CS/3:1 | 69.9 | 75.9 | 77.3 | 80.7 |
| HW:CS/3:1, 150° C. | 48.8 | 60.8 | 65.5 | 69.8 |
| LB gum, 150° C. | 48.8 | 60.5 | 65.5 | 69.8 |
| LB gum, 185° C. | 29.4 | 50.4 | 53.4 | 52.3 |
| LB gum, fine particles, 185° C. | 86.8 | Particleboard deformation | | |
| LB gum, coarse particles, 185° C. | 18.6 | 48.2 | 55.3 | 58.9 |

The invention claimed is:

1. A particle board comprising an adhesive aqueous composition comprising a polysaccharide, wherein the polysaccharide is locust bean gum, and an amine-functional polymer, wherein said amine functional polymer is chitosan; wherein the weight ratio between the polysaccharide and the amine-functional polymer is from 1:4 to 4:1; and with proviso that the composition has a pH of 6 or less.

2. The particle board according to claim 1, wherein the weight ratio between the polysaccharide and the amine-functional polymer is from 1:3 to 3:1.

3. The particle board according to claim 1, wherein composition comprises 6-15 wt % locust bean gum.

4. A method of preparing the particle board according to claim 1, comprising:
providing wood particles with an initial water content;
providing the adhesive aqueous composition;
mixing the wood particles and the adhesive aqueous composition forming a first mixture;
adding water to the first mixture and mixing forming a second mixture;
drying the second mixture to a second water content;
pressing the second mixture at a first pressure to obtain a product; and
drying the product to obtain the particle board.

5. The method according to claim 4 wherein the wood particles have a size of 2-10 mm and wherein the wood particles have an initial water content of 35-40%.

6. The method according to claim 4 wherein the second water content is 25-35 wt %.

7. The method according to claim 4 wherein the pressing of the second mixture is done at a press temperature of 150-200° C., and wherein the first pressure is 4-8 metric ton.

8. The method according to claim 4, wherein the pressing is done at room temperature and wherein the applied pressure is 0.5-2M Pa.

* * * * *